(12) United States Patent
Raman et al.

(10) Patent No.: US 11,379,461 B2
(45) Date of Patent: Jul. 5, 2022

(54) MULTI-MASTER ARCHITECTURES FOR DISTRIBUTED DATABASES

(71) Applicant: Microsoft Technology Licensing, LLC, Redmond, WA (US)

(72) Inventors: Karthik Raman, Sammamish, WA (US); Momin Mahmoud Al-Ghosien, Sammamish, WA (US); Bhalakumaaran Erode Ranganathan, Bellevue, WA (US); Madhan Gajendran, Bengaluru (IN); Ji Huang, Bothell, WA (US); Atul Katiyar, Sammamish, WA (US); Mikhail Mikhailovich Koltachev, Redmond, WA (US); Sujit Vattathil Kuruvilla, Redmond, WA (US); Digvijaysinh Govindbhai Makwana, Seattle, WA (US); Subramanyam Pattipaka, Bellevue, WA (US); Ovidiu Constantin Platon, Redmond, WA (US); Ankur Savailal Shah, Redmond, WA (US); Pankaj Sharma, Kirkland, WA (US); Dharma Shukla, Bellevue, WA (US); Shreshth Singhal, Seattle, WA (US); Shireesh Kumar Thota, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 378 days.

(21) Appl. No.: 16/207,176

(22) Filed: Dec. 2, 2018

(65) Prior Publication Data
US 2019/0340167 A1  Nov. 7, 2019

Related U.S. Application Data

(60) Provisional application No. 62/668,226, filed on May 7, 2018.

(51) Int. Cl.
*G06F 16/23* (2019.01)
*G06F 16/27* (2019.01)
(Continued)

(52) U.S. Cl.
CPC ........ *G06F 16/2365* (2019.01); *G06F 9/5077* (2013.01); *G06F 11/2007* (2013.01);
(Continued)

(58) Field of Classification Search
None
See application file for complete search history.

(56) References Cited

U.S. PATENT DOCUMENTS

| 5,446,880 A | 8/1995 | Balgeman et al. |
| 5,581,753 A | 12/1996 | Terry et al. |

(Continued)

FOREIGN PATENT DOCUMENTS

| CN | 102497410 A | 6/2012 |
| CN | 104935672 A | 9/2015 |

(Continued)

OTHER PUBLICATIONS

"Notice of Allowance Issued in U.S. Appl. No. 15/991,632", dated Dec. 10, 2020, 10 Pages.
(Continued)

*Primary Examiner* — Giuseppi Giuliani
(74) *Attorney, Agent, or Firm* — Ray Quinney & Nebeker P.C; James Bullough

(57) ABSTRACT

Data services for workloads are often provided with a service level agreement specifying various performance guarantees (e.g., latency, availability, scalability, and consistency). Single-master architectures, in which updates to the data set are constrained to a single server, may limit the fulfillment of some performance guarantees. Presented herein are multi-master architectures, in which the server set
(Continued)

is partitioned into at least two masters are permitted to update the data set and at least one non-master that is not permitted to update the data set. Non-masters that receive a request to update the data set forward the request to a master server for application to the data set. A master that receives the request applies it to the data set and propagates the update to other master and non-master servers. Conflicting updates may be resolved through a variety of conflict resolution techniques, optionally designating one master server as a conflict resolution server.

20 Claims, 12 Drawing Sheets

(51) Int. Cl.
| | |
|---|---|
| *G06F 11/20* | (2006.01) |
| *G06F 16/22* | (2019.01) |
| *G06F 16/2452* | (2019.01) |
| *G06F 16/28* | (2019.01) |
| *G06F 16/25* | (2019.01) |
| *G06F 16/21* | (2019.01) |
| *H04L 67/1008* | (2022.01) |
| *G06F 9/50* | (2006.01) |
| *H04L 41/0896* | (2022.01) |
| *H04L 41/5009* | (2022.01) |
| *H04L 47/72* | (2022.01) |
| *H04L 47/762* | (2022.01) |
| *G06F 16/182* | (2019.01) |
| *G06F 16/903* | (2019.01) |
| *H04L 41/5019* | (2022.01) |
| *H04L 67/1012* | (2022.01) |
| *H04L 67/1034* | (2022.01) |
| *H04L 41/0803* | (2022.01) |
| *H04L 41/5022* | (2022.01) |
| *H04L 41/50* | (2022.01) |
| *H04L 69/24* | (2022.01) |
| *H04L 67/1029* | (2022.01) |

(52) U.S. Cl.
CPC ...... *G06F 11/2023* (2013.01); *G06F 11/2056* (2013.01); *G06F 16/184* (2019.01); *G06F 16/211* (2019.01); *G06F 16/219* (2019.01); *G06F 16/2246* (2019.01); *G06F 16/2255* (2019.01); *G06F 16/2272* (2019.01); *G06F 16/2315* (2019.01); *G06F 16/2322* (2019.01); *G06F 16/2329* (2019.01); *G06F 16/2336* (2019.01); *G06F 16/2452* (2019.01); *G06F 16/252* (2019.01); *G06F 16/258* (2019.01); *G06F 16/27* (2019.01); *G06F 16/28* (2019.01); *G06F 16/903* (2019.01); *H04L 41/0803* (2013.01); *H04L 41/0896* (2013.01); *H04L 41/5009* (2013.01); *H04L 41/5019* (2013.01); *H04L 41/5022* (2013.01); *H04L 41/5032* (2013.01); *H04L 47/72* (2013.01); *H04L 47/762* (2013.01); *H04L 67/1008* (2013.01); *H04L 67/1012* (2013.01); *H04L 67/1034* (2013.01); *H04L 69/24* (2013.01); *G06F 2201/80* (2013.01); *H04L 67/1029* (2013.01)

(56) References Cited

U.S. PATENT DOCUMENTS

| | | |
|---|---|---|
| 5,581,754 A | 12/1996 | Terry et al. |
| 5,787,262 A | 7/1998 | Shakib et al. |
| 5,806,074 A * | 9/1998 | Souder ............... G06F 11/2035 |
| 5,923,850 A | 7/1999 | Barroux |
| 6,523,032 B1 | 2/2003 | Sunkara et al. |
| 6,535,874 B2 | 3/2003 | Purcell |
| 6,925,457 B2 | 8/2005 | Britton et al. |
| 7,117,221 B2 | 10/2006 | Hahn et al. |
| 7,269,648 B1 | 9/2007 | Krishnan et al. |
| 7,509,354 B2 | 3/2009 | McGarvey |
| 7,606,838 B2 | 10/2009 | Tobies |
| 7,689,599 B1 | 3/2010 | Shah et al. |
| 7,751,331 B1 | 7/2010 | Blair et al. |
| 7,774,473 B2 | 8/2010 | Elving et al. |
| 7,877,644 B2 | 1/2011 | Stenzel |
| 8,311,981 B2 | 11/2012 | Braginsky et al. |
| 8,326,807 B2 | 12/2012 | Aiyer et al. |
| 8,386,421 B2 | 2/2013 | Reid et al. |
| 8,392,482 B1 | 3/2013 | McAlister et al. |
| 8,572,022 B2 | 10/2013 | Hagan et al. |
| 8,595,267 B2 | 11/2013 | Sivasubramanian et al. |
| 8,694,639 B1 | 4/2014 | Vermeulen et al. |
| 8,719,313 B2 | 5/2014 | Swett et al. |
| 8,745,127 B2 | 6/2014 | Gopal et al. |
| 8,824,286 B2 | 9/2014 | Lee et al. |
| 8,862,588 B1 | 10/2014 | Gay et al. |
| 8,880,508 B2 | 11/2014 | Jeong et al. |
| 8,943,180 B1 | 1/2015 | Petit-Huguenin |
| 8,972,491 B2 | 3/2015 | Abu-Libdeh et al. |
| 9,026,493 B1 | 5/2015 | Weng |
| 9,195,725 B2 | 11/2015 | Brown et al. |
| 9,219,686 B2 | 12/2015 | Hilt et al. |
| 9,225,770 B2 | 12/2015 | Wang et al. |
| 9,230,040 B2 | 1/2016 | Shukla et al. |
| 9,244,926 B2 | 1/2016 | Kakivaya et al. |
| 9,292,566 B2 | 3/2016 | Golab et al. |
| 9,356,793 B1 | 5/2016 | Drobychev et al. |
| 9,405,474 B2 | 8/2016 | Shukla et al. |
| 9,411,873 B2 | 8/2016 | Rath et al. |
| 9,460,129 B2 | 10/2016 | Mann |
| 9,462,427 B2 | 10/2016 | Patel et al. |
| 9,471,711 B2 | 10/2016 | Abadi et al. |
| 9,569,513 B1 | 2/2017 | Vig et al. |
| 9,619,261 B2 | 4/2017 | Gaurav et al. |
| 9,632,828 B1 | 4/2017 | Mehta et al. |
| 9,645,835 B2 | 5/2017 | Phillips et al. |
| 9,781,124 B2 | 10/2017 | Goldberg et al. |
| 9,888,067 B1 | 2/2018 | Yemini et al. |
| 10,521,311 B1 * | 12/2019 | Greenwood ........ G06F 11/2028 |
| 10,552,443 B1 | 2/2020 | Wu et al. |
| 2002/0035642 A1 | 3/2002 | Clarke et al. |
| 2002/0161757 A1 | 10/2002 | Mock et al. |
| 2003/0037283 A1 | 2/2003 | Srinivasan et al. |
| 2003/0046396 A1 | 3/2003 | Richter et al. |
| 2003/0135643 A1 | 6/2003 | Chiu et al. |
| 2003/0220966 A1 | 11/2003 | Hepper et al. |
| 2004/0230571 A1 | 11/2004 | Robertson |
| 2004/0230619 A1* | 11/2004 | Blanco ................ G06F 16/27 |
| 2004/0236801 A1 | 11/2004 | Borden et al. |
| 2005/0015436 A1 | 1/2005 | Singh et al. |
| 2005/0044530 A1 | 2/2005 | Novik et al. |
| 2005/0138170 A1 | 6/2005 | Cherkasova et al. |
| 2005/0160133 A1 | 7/2005 | Greenlee et al. |
| 2006/0106879 A1 | 5/2006 | Zondervan et al. |
| 2006/0155945 A1 | 7/2006 | Mcgarvey |
| 2006/0224773 A1 | 10/2006 | Degenaro et al. |
| 2006/0282836 A1 | 12/2006 | Barker |
| 2007/0073675 A1 | 3/2007 | Kaar et al. |
| 2008/0147627 A1 | 6/2008 | Natkovich et al. |
| 2008/0301025 A1 | 12/2008 | Boss et al. |
| 2009/0248737 A1 | 10/2009 | Shukla et al. |
| 2010/0082630 A1 | 4/2010 | Zagelow et al. |
| 2010/0094838 A1 | 4/2010 | Kozak |
| 2011/0149743 A1 | 6/2011 | Agarwal et al. |
| 2011/0258483 A1 | 10/2011 | Elson et al. |
| 2012/0136839 A1 | 5/2012 | Eberlein et al. |
| 2012/0185444 A1 | 7/2012 | Sparkes et al. |
| 2013/0064110 A1 | 3/2013 | Polinati et al. |
| 2013/0159253 A1 | 6/2013 | Dewall et al. |
| 2013/0232153 A1 | 9/2013 | Dhuse et al. |
| 2013/0254164 A1 | 9/2013 | Tsofi et al. |

(56) References Cited

U.S. PATENT DOCUMENTS

| | | | |
|---|---|---|---|
| 2014/0052761 | A1 | 2/2014 | Teitelbaum |
| 2014/0101298 | A1 | 4/2014 | Shukla et al. |
| 2014/0195514 | A1 | 7/2014 | Stein |
| 2014/0279844 | A1 | 9/2014 | Shukla et al. |
| 2014/0289382 | A1 | 9/2014 | Chan et al. |
| 2014/0297776 | A1 | 10/2014 | Volvovski et al. |
| 2014/0304371 | A1 | 10/2014 | Mraz et al. |
| 2014/0359348 | A1 | 12/2014 | Volvovski et al. |
| 2015/0026189 | A1 | 1/2015 | Li et al. |
| 2015/0154074 | A1 | 6/2015 | Resch et al. |
| 2015/0195162 | A1 | 7/2015 | Gandham et al. |
| 2015/0199134 | A1 | 7/2015 | Mondal et al. |
| 2015/0269239 | A1 | 9/2015 | Swift et al. |
| 2015/0304983 | A1 | 10/2015 | Krening et al. |
| 2016/0034433 | A1 | 2/2016 | Yamat et al. |
| 2016/0321588 | A1 | 11/2016 | Das et al. |
| 2016/0342645 | A1 | 11/2016 | Tempero et al. |
| 2017/0068713 | A1 | 3/2017 | Joshi et al. |
| 2017/0123948 | A1 | 5/2017 | Dhuse et al. |
| 2017/0199770 | A1 | 7/2017 | Peteva et al. |
| 2017/0201597 | A1 | 7/2017 | Narasimhan et al. |
| 2017/0220651 | A1 | 8/2017 | Mathew et al. |
| 2017/0286180 | A1 | 10/2017 | He et al. |
| 2017/0293540 | A1 | 10/2017 | Mehta et al. |
| 2017/0308562 | A1 | 10/2017 | Sreekantaiah et al. |
| 2017/0308601 | A1 | 10/2017 | Massarenti et al. |
| 2017/0318085 | A1 | 11/2017 | Shukla et al. |
| 2017/0364345 | A1 | 12/2017 | Fontoura et al. |
| 2018/0150331 | A1 | 5/2018 | Chen et al. |
| 2018/0189369 | A1 | 7/2018 | Baek et al. |
| 2018/0316752 | A1 | 11/2018 | Hodges et al. |
| 2019/0050216 | A1* | 2/2019 | Brundidge ............ G06Q 10/101 |
| 2019/0163391 | A1 | 5/2019 | Annamalai et al. |
| 2019/0166019 | A1 | 5/2019 | Jagadeesh |
| 2019/0171737 | A1 | 6/2019 | Duan et al. |
| 2019/0196878 | A1 | 6/2019 | Li |
| 2019/0340166 | A1 | 11/2019 | Raman et al. |
| 2019/0340168 | A1 | 11/2019 | Raman et al. |
| 2019/0340265 | A1 | 11/2019 | Raman et al. |
| 2019/0340273 | A1 | 11/2019 | Raman et al. |
| 2019/0340291 | A1 | 11/2019 | Raman et al. |
| 2019/0342188 | A1 | 11/2019 | Raman et al. |
| 2019/0342379 | A1 | 11/2019 | Shukla et al. |
| 2019/0342380 | A1 | 11/2019 | Thota et al. |
| 2020/0117748 | A1* | 4/2020 | Gupte .................... G06F 16/27 |

FOREIGN PATENT DOCUMENTS

| | | | |
|---|---|---|---|
| WO | 9735270 | A1 | 9/1997 |
| WO | 2008100795 | A1 | 8/2008 |
| WO | 2010048595 | A2 | 4/2010 |

OTHER PUBLICATIONS

"Final Office Action Issued in U.S. Appl. No. 15/991,786", dated Oct. 23, 2020, 16 Pages.

"International Search Report and Written Opinion Issued in PCT Application No. PCT/US2019/031207", dated Jul. 19, 2019, 13 Pages.

"International Search Report and Written Opinion Issued in PCT Application No. PCT/US2019/031204", dated Jul. 19, 2019, 14 Pages.

"International Search Report and Written Opinion Issued in PCT Application No. PCT/US2019/031208", dated Jul. 24, 2019, 15 Pages.

"Non Final Office Action Issued in U.S. Appl. No. 15/991,953", dated Aug. 22, 2019, 21 Pages.

"Notice of Allowance Issued in U.S. Appl. No. 15/991,062", dated Mar. 18, 2020, 9 Pages.

"Non Final Office Action Issued in U.S. Appl. No. 15/991,223", dated Apr. 9, 2020, 15 Pages.

"Non Final Office Action Issued In U.S. Appl. No. 15/991,632", dated Jan. 24, 2020, 23 Pages.

"Final Office Action Issued In U.S. Appl. No. 15/991,953", dated Feb. 14, 2020, 24 Pages.

Likness, Jeremy, "Getting Behind the 9-Ball: Cosmos DB Consistency Levels Explained", Retrieved From: https://blog.jeremylikness.com/blog/2018-03-23_getting-behind-the-9ball-cosmosdb-consistency-levels/, Mar. 23, 2018, 8 Pages.

Montazerolghaem, et al., "Overload Control in SIP Networks: A Heuristic Approach based on Mathematical Optimization", In Proceedings of Global Communications Conference (GLOBECOM), Dec. 6, 2015, 6 Pages.

"Final Office Action Issued in U.S. Appl. No. 15/991,632", dated May 19, 2020, 22 Pages.

"Non-Final Office Action Issued in U.S. Appl. No. 15/991,786", dated May 8, 2020, 36 Pages.

"Non-Final Office Action Issued in U.S. Appl. No. 15/991,880", dated Jun. 10, 2020, 37 Pages.

Buckler, Craig, "How to Convert XML to a JSON-Like JavaScript Object", Retrieved From: http://www.sitepoint.com/how-to-convert-xml-to-a-javascript-object, Oct. 20, 2011, 9 Pages.

Chan, et al., "Taming XPath Queries by Minimizing Wildcard Steps", In Proceedings of the 30th VLDB Conference, Aug. 31, 2004, pp. 156-167.

He, et al., "Query Language and Access Methods for Graph Databases", In Book Managing and Mining Graph Data, 2010, pp. 125-160.

Kossmann, Donald, "The State of the Art in Distributed Query Processing", In ACM Computing Surveys, vol. 32, No. 4, Dec. 2000, pp. 422-469.

Kraska, et al., "Consistency Rationing in the Cloud: Pay only when it Matters", In Proceedings of the Very Large Data Bases Endowment, vol. 2, Issue 1, Aug. 24, 2009, 12 Pages.

Lim, et al., "Automated Control For Elastic Storage", In Proceedings of the 7th International Conference on Autonomic Computing, Jun. 7, 2010, pp. 1-10.

Moon, et al., "Introducing SSDs to the Hadoop MapReduce Framework", In Proceedings of 7th International Conference on Cloud Computing, Jun. 27, 2014, pp. 272-279.

Xue, et al., "COMET: Client-Oriented Metadata Servcie for Highly Available Distributed File Systems", In Proceedings of 27th International Symposium on Computer Architecture and High Performance Computing (SBAC-PAD), Oct. 17, 2015, pp. 154-161.

"Non Final Office Action Issued in U.S. Appl. No. 15/991,953", dated Jul. 16, 2020, 24 Pages.

"Conflict Resolution", Retreived from https://web.archive.org/web/20120402192233/https:/docs.oracle.com/cd/E11882_01/server.112/e10706/repconflicts.htm, Apr. 2, 2012, 28 Pages.

"Conflict Resolution", Retrieved from https://docs.oracle.com/cd/F49540_01/DOC/server.815/a67791/ch6.htm, Retrieved Date: Aug. 31, 2018, 43 Pages.

"Conflict Resolution Concepts and Architecture", Retrieved from https://docs.oracle.com/cd/B10500_01/server.920/a96567/repconflicts.htm, Nov. 15, 2011, 35 Pages.

"Couchbase Server: Schemaless Data Modeling", Retrieved from https://developer.couchbase.com/documentation/server/3.x/developer/dev-guide-3.0/schemaless.html, Retrieved Date: Nov. 20, 2017, 5 Pages.

"Lotus Notes/Domino Replication Conflict Solver", Retrieved from https://web.archive.org/web/20100306134644/http://www.ytria.com/WebSite.nsf/WebPageRequest/Solutions_scanEZ_ConflictSolveren, Dec. 15, 2005, 2 Pages.

"Master Replication Concepts and Architecture", Retrieved from https://docs.oracle.com/cd/B10501_01/server.920/a96567/repmaster.htm, Feb. 17, 2012, 40 Pages.

"Master-master vs Master-slave Database Architecture?", Retrieved from https://stackoverflow.com/questions/3736969/master-master-vs-master-slave-database-architecture, Retrieved Date: Jul. 2, 2018, 8 Pages.

"Master-to-Slave Replication", Retrieved from https://www.ibm.com/support/knowledgecenter/en/POWER8/p8ha1/example2mastertoslavereplication.htm, Retrieved Date: Jul. 3, 2018, 4 Pages.

(56) References Cited

OTHER PUBLICATIONS

"Replica Set Elections", Retrieved from https://docs.mongodb.com/manual/core/replica-set-elections/, Retrieved Date: Jul. 2, 2018, 6 Pages.

Afriansyah, et al., "Model of Load Balancing Using Reliable Algorithm With Multi-Agent System", In Journal of IOP Conference Series: Materials Science and Engineering, vol. 190, Issue 1, Apr. 2017, 9 Pages.

Ardagna, et al., "SLA Based Resource Allocation Policies In Autonomic Environments", In Journal of Parallel and Distributed Computing, vol. 67, Issue 3, Mar. 1, 2007, pp. 259-270.

Fernandez, et al., "Autoscaling Web Applications in Heterogeneous Cloud Infrastructures", In Proceedings of IEEE International Conference on Cloud Engineering, Mar. 11, 2014, 11 Pages.

Gunda, et al., "Multi-master at global scale with Azure Cosmos DB", Retrieved from https://docs.microsoft.com/en-us/azure/cosmos-db/multi-region-writers, May 7, 2018, 9 Pages.

Liu, et al., "Consistency as a Service: Auditing Cloud Consistency", In Journal of IEEE Transactions on Network and Service Management, vol. 11, Issue 1, Mar. 2014, pp. 25-35.

Masha, et al., "Implement a Custom Conflict Resolver for a Merge Article", Retrieved from https://docs.microsoft.com/en-us/sql/relational-databases/replication/implement-a-custom-conflict-resolver-for-a-merge-article?view=sql-server-2017, Mar. 14, 2017, 6 Pages.

Patra, Chandan, "How to Use Consistency Models for Amazon Web Services", Retrieved from https://cloudacademy.com/blog/consistency-models-of-amazon-cloud-services/, Jun. 3, 2016, 9 Pages.

Shukla, et al., "Schema-Agnostic Indexing with Azure DocumentDB", In Proceedings of 41st International Conference on Very Large Data Bases, vol. 8, Issue 12, Aug. 1, 2015, pp. 1668-1679.

Singh, et al., "Server-Storage Virtualization: Integration and Load Balancing in Data Centers", In Proceedings of ACM/IEEE Conference on Supercomputing, Nov. 15, 2008, 12 Pages.

Thomsen, Jakob Holdgaard, "UBER Engineering: The Architecture of Schemaless, Uber Engineering's Trip Datastore Using MySQL", Retrieved from https://eng.uber.com/schemaless-part-two/, Jan. 15, 2016, 8 Pages.

"Non Final Office Action Issued in U.S. Appl. No. 16/207,170", dated May 20, 2021, 21 Pages.

"Non Final Office Action Issued in U.S. Appl. No. 16/209,647", dated May 25, 2021, 15 Pages.

"Final Office Action Issued in U.S. Appl. No. 16/207,170", dated Sep. 7, 2021, 23 Pages.

"Final Office Action Issued in U.S. Appl. No. 16/209,647", dated Nov. 17, 2021, 13 Pages.

\* cited by examiner

MULTI-MASTER ARCHITECTURES FOR DISTRIBUTED DATABASES

CROSS-REFERENCE TO RELATED APPLICATIONS

This application is a continuation-in-part of, and claims priority under 35 U.S.C. 35 U.S.C. §§ 119 and/or 120 to, U.S. Patent Application No. 62/668,226, entitled "Distributed Databases," filed on May 7, 2018, the entirety of which is hereby incorporated by reference as if fully rewritten herein.

ORGANIZATION OF DISCLOSURE

The present disclosure is organized as follows:

BACKGROUND

Within the field of computing, many scenarios involve a distributed data service that processes data on behalf of various workloads. In such scenarios, the workloads are often constrained by a set of performance criteria, such as low latency, high availability, throughput, scalability to accommodate surges in demand, and/or consistency guarantees of various types and levels. The performance criteria for respective workloads are often formalized in a service level agreement, whereby the provider of the distributed data service provides a guarantee that the distributed data service will satisfy the performance criteria of the workload.

The distributed data services are often configured to allocate resources to satisfy one or more performance criterion, such as the details of the service level agreement. A notable technique for maintaining a consistency guarantee for a workload involves the identification, among the distributed servers that process the workload, of a single master that is permitted to update the stored data of the workload. By limiting the updates to a single master, the distributed data service avoids the potential of data conflicts that might arise from writing data at multiple locations. The identification of a single master may also provide other advantages, such as a determinable upper bound on the delay in propagating updates across all of the other servers that process the workload, based on the calculable propagation delay from the master server to every other server. As another example, it may be advantageous to choose, as the single master, a server that is in proximity to an anticipated source of the updates, e.g., in order to reduce network transport delays and latency.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The designation of a single master as the sole server in the distributed data service that is permitted to alter the data of a workload may provide some advantages, but may also incur some disadvantages that may be significant for some workloads. As a first example, the single master may present a performance bottleneck; e.g., if write requests arrive at a faster rate than the master can process, writes may be unavoidably delayed. As a second example, latency not be reducible to a desired level, due to the propagation delays of the single master to the entire data set. For particularly latency-sensitive workloads, it may not be possible to identify any server as the single master that is capable of propagating updates over the entire distributed data set, because the rate of update propagation from a single server is unavoidably limited by the speed of light and the maximum achievable transmission rates of contemporary networking equipment. As a third example, the designation of a single server as the sole source of updates may create a single point of failure; e.g., if the single-master server encounters a failure or a network partition, all capability of reliable updates to the data set may have to be postponed until a substitute server is selected, provisioned, and ready to take over as a substitute single master.

In order to alleviate the limitations of a single-master configuration of the data service, it may be desirable to permit the designation of multiple masters that are permitted to update the data set of a workload. While such designation may enable advances in the properties noted above (e.g., latency reduction, throughput, scalability, availability, and consistency), the designation of multiple masters may raise the prospect of data versioning conflicts, which, if undetected and unhandled, may compromise the integrity and logical validity of the data set.

Presented herein are techniques for establishing a multi-master server set. In an embodiment, a server is configured to participate in a server set for a data set by receiving a designation selected from a designation set comprising a master of the data set and a non-master of the data set, wherein the server set includes at least one other server that has also been designated as a master. The server receives an update of the data set and processes it based upon its designation. While designated as a non-master, the server forwards the update to a master for application to the data set; and while designated as a master, the server applies the update to the data set and forwards the update to at least one other master or non-master server of the server set.

In an embodiment, a server is configured to apply a method to participate in a server set that serves a data set. The method involves executing, by a processor of the server, instructions that cause the server to receive a designation of the server for the data set, wherein the designation is selected from a designation set comprising a master of the data set and a non-master of the data set, and wherein the server set includes at least one other server that has also been designated as a master. Execution of the instructions also causes the server to receive an update of the data set and to process the update based upon the designation. While designated as a non-master of the data set, the server forwards the update to a master of the serer set for application to the data set; and while designated as a master of the data set, the server applies the update to the data set and propagates the update to at least one other master or non-master server of the server set.

In an embodiment, a server set is partitioned into at least two servers that are designated as masters and that are permitted to update the data set, and the remaining servers are designated as non-masters that are permitted to read, but not update, the data set, where the designation of the servers fulfills the performance criteria of the data set. An update of the data set that is received by a non-master is forwarded to one of the masters, which applies it to the data set and propagates it to at least some of the other servers of the server set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
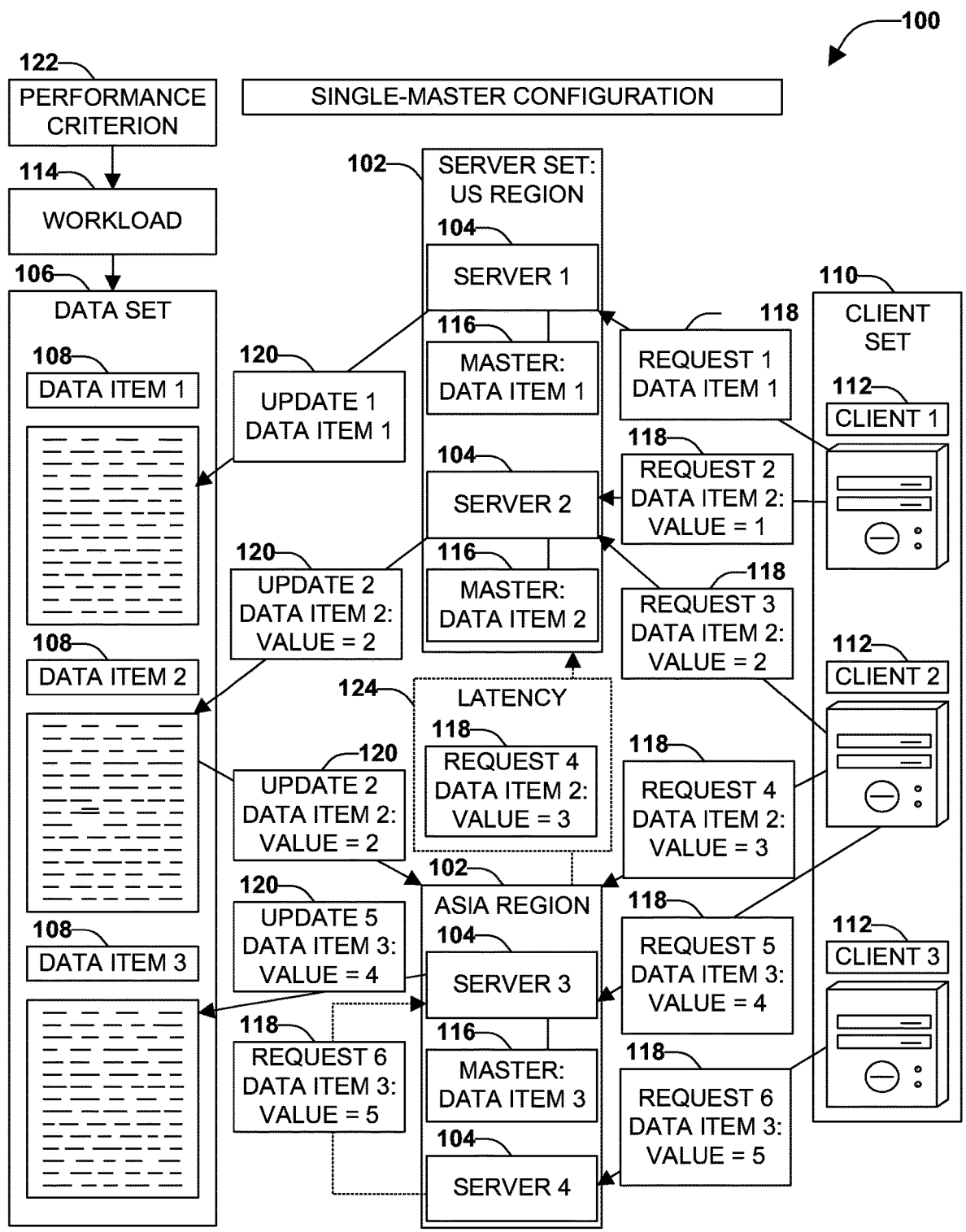
FIG. 1 is an illustration of an example scenario featuring a single-master configuration of a server set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

Modern data services are often distributed over a set of servers in various ways, ranging from local distribution within a rack, server room, building, or campus to regional distribution over a set of cities, countries, or continents. Data services are often provided to process a set of workloads from one or more clients, such as databases that are targeted by a volume of queries.

A variety of server architecture configurations may be utilized to satisfy the consistency level of a workload. For particularly conflict-sensitive workloads, the server architecture may be selected to ensure that updates are provided in a specific order by restricting all updates of the data set of the workload to a single "master" server. While all servers that service the workload may fulfill requests to read the data, any server except the master server that receives a write request may forward it to the master server for processing. By serving as the single point of writes to the data set, the single master server may apply all updates in a correct order and propagate updates to the other servers of the server set. In this manner, a strong consistency level may be applied to satisfy the data version conflict sensitivity of the workload.

FIG. 1 is an illustration of an example scenario 100 featuring a single-master configuration of a server set 102. In this example scenario 100, the server set 102 comprises a set of servers 104 that are distributed over a set of geographic regions, such as a first server 104 and a second server 104 that are deployed in a U.S. region and a third server 104 and a fourth server 104 that are deployed in an Asian region. The server set 102 may coordinate access to a data set 106, comprising a set of data items 108, on behalf of a client set 110 of clients 112, which may also be distributed over a set of regions. Respective clients 112 may issue requests 118 to access one or more data items 108 to a selected server 104 of the server set 102 in the context of a workload 114, such as an application, a services platform, or a task. The requests 118 may specify a read operation (such as a get request or a query such as a search) or a write operation (such as a create, update, or delete request, or a merging, splitting, or copying of data items 108). The servers 104 may share a copy of the data set 106, such as by deploying an up-to-date copy of the data set 106 to each region for local or at least proximate access by the servers 104 in the region, and a selected server 104 may fulfill a read operation by retrieving information from the local copy of a data item 108 and returning it to the client 112 in response to the request 118. However, requests 118 that involve write operations that modify one or more data items 108 of the data set 106 may be more difficult to fulfill in a manner that avoids data version conflicts. For example, a first client 112 may transmit a first request 118 to update 120 a particular data item 108 to a first value, while a second client 112 may simultaneously submit a second request 118 to update 120 the same data item 108 to a second, different value. If both requests 118 are transmitted to the same server 104, the server 104 may detect the conflicting requests 118 and may resolve the conflict in a variety of ways (e.g., selecting one write request 118 to be committed to the data set 106 as an update 120 while rejecting the other write request 118; rejecting both write requests 118 as mutually conflicting; and/or merging the write requests 118 into a single update 120 that reflects both write requests 118). However, if the first request 118 is transmitted to a first server 104 and the second request 118 is transmitted to a second server 104, each server 104 may commit the respective request 118 and then propagate the resulting update 120 to other servers 104 in the server set 102. The conflicting updates 120 may be detected after-the-fact in a manner that reveals the occurrence of a data version conflict, wherein different servers 104 ascribe different values to one or more data items 108, where the coexistence of such inconsistent and mutually incompatible updates 120 causes the servers 104 of the server set 102 to disagree about the state of the data set 106. As a result, the workload 114 may become logically inconsistent due to the conflicting updates 120, which may result in a corruption of the data set 106, a failure of the workload 114, and/or a propagation of the data version conflict to the clients 112 that utilize the data set 106 for the workload 114.

As further illustrated in the example scenario 100 of FIG. 1, the incidence of data version conflicts and consequences thereof may be avoided or reduced through the use of a single-master configuration, in which each data item 108 may be updated by only a single server 104 of the server set 102 that is designated as a master 116 of the data item 108. In this example scenario 100, the first server 104 is designated as the sole master 116 for the first data item 108; the second server 104 is designated as the sole master 116 for the second data item 108; and the third server 104 is designated as the sole master 116 for the third data item 108. Each server 104 is capable of reading any of the data items 108, but only the server 104 designated as the master 116 of a data item 108 is permitted to apply an update 120 to the data item 108. The fourth server 104 is not designated as a master 116 of any of the data items 108, but is only capable of reading the data items 108. When clients 112 send requests 118 involving a read operation, any server 104 receiving the request 118 may read the data item 108 and return the retrieved data to the client 112. However, when a request 118 involves a write operation involving a particular data item 108, the server 104 receiving the request 118 identifies the master 116 that is designated for the data item 108. If the server 104 receiving the request 118 is also the master 116 for the data item 108 involved in the request 118, the server 104 may apply the requested update 120 to data item 108 and then propagate the update 120 to other servers 104 of the server set 102 (e.g., by forwarding a notification of the update 120 to the other servers 104 and/or by synchronizing a portion of the data set 106, including the updated data item 108, with the other servers 104). For example, the first server 104 receives a first request 118 to update the first data item 108, and may handle the request 118 by updating the first data item 108. If the first request 118 had been sent to any other server 104 that is not the sole master 116, the server 104 would have refused the request 118 and/or forwarded the request 118 to the server 104 that is designated as the sole master 116. For example, when the third server 104, which is designated as the sole master 116 of the third data item 108, receives a fourth request 118 that requests an update 120 of the third data item 108, the third server 104 applies the update 120 to the third data item 108. However, when a fourth server 104, which is not a master of the third data item 108, receives a sixth request 118 to update the third data item 108, the fourth server 104 does not fulfill the request 118 by applying an update 120 to the third data item 108, but rather forwards the sixth request 118 to the third server 104, which may be permitted to update the third item 108 in accordance with its designation as the sole master 116 of the third data item 108.

The single-master configuration of the server set 102 enables the servers 104 to coordinate the application of updates 120 in a manner that may reduce data version conflicts. For example, the second server 104 is designated as the sole master 116 of the second data item 108, such that all requests 118 that involve updating the second data item 108 are forwarded to the second server 104 for evaluation. The second server 104 may apply a logic to the evaluation of requests 118 in order to select and apply updates 120 that preserve the consistency of the data set 106. For example, the logical consistency of the data set 106 may depend upon a monotonically increasing value of the second data item 108, such that a first update 120 that establishes a selected value of the second data item 108 is not chronologically followed by a second update 120 of the second data item 108 with a lower value, such as in the manner of a timestamp or monotonically increasing counter. Because all requests 118 are either received by or forwarded to the second server 104 as the sole master 116 of the second data item 108, the second server 104 may evaluate each request 118 in a sequence, such as in order of receipt or timestamp, and may verify that updates 120 to the second data item 108 are only applied in a manner that achieves a monotonically increasing value for the second data item 108. If a request 118 is received that involves an update 120 of the second data item 108 that causes the data set 106 to be logically inconsistent in view of past updates 120 and the current state of the second data item 108, the second server 104 may choose not to apply the update 120 and may refuse the request 118. Alternatively, the second server 104 may be able to initiate a remedial measure that enables the fulfillment of the second request 118 in a manner that preserves the logical consistency of the second data item 108. For example, if the request 118 is to update a monotonically increasing value (currently 3) to 4, but the request 118 is received after an earlier but still pending request 118 to update the value to 5, the second server 104 may reorder the sequence of the requests 118 in order to apply the corresponding updates 120 in a manner that enables the value of the second data item 108 to remain monotonically increasing.

The designation of the second server 104 as the sole master 116 for the second data item 108 also avoids data version conflicts that arise due to a set of requests 118 that represent a logical conflict if applied concurrently to the data item 108. For example, a first client 112 and a second client 112 may each submit a request 118 to update the second data item 108 to a different value. If the requests 118 were received by different servers 104 and separately applied to the data set 106 (such as in different regions), some servers 104 may utilize the first value (e.g., 1) for the second data item 108 while, concurrently, other servers 104 may utilize the second value (e.g., 2) for the same second data item 108. Such data version conflicts may be avoided or reduced through the designation of the second server 104 as the sole master of the second data item 108, since both requests 118 are either submitted directly to the second server 104 or forwarded to the second server 104 from the server 104 that initially received the request 118. The second server 104 may identify the conflicting requests 118 and may choose one according to a data version conflict resolution technique (e.g., selecting the earlier request 118 or the later request 118 according to timestamps associated with each request 118, or selecting the first request 118 or the second request 118 according to the sequential order in which the requests 118 arrived at the second server 104), or, alternatively, may choose another resolution that fulfills both requests 118 (e.g., applying an update 120 that sets the value of the second data item 108 to 3).

The single-master configuration of the server set 102 also enables updates 120 to be propagated from the sole master 116 to the other servers 104 of the server set 102, either directly or through an intermediate server 104. For example, when the second server 104 applies an update 120 to the second data item 108 within the local copy of the data set 106, the update 120 may be immediately visible to the first server 104, which is collocated with the second server 104 in the region and utilizes the same copy of the data set 106. Alternatively, the second server 104 may transmit the update 120 to the first server 104 within the same region, which may be facilitated by the proximity of the first server 104 to the second server 104 and/or fast and plentiful bandwidth interconnecting the first server 104 and the second server 104. The second server 104 may also transmit the update 120 to the Asia region, e.g., by applying the update 120 to a remote copy of the data set 106 that is viewable to the third server 104 and the fourth server 104, or by transmitting the update 120 to the third server 104 for application to the copy of the data set 106 that is local to the servers 104 of the Asia region. Such propagation may continue through other servers 104 and other local copies of the data set 106 (e.g., the third server 104 may propagate the same update 120 to the fourth server 104, and/or to other servers 104 located in other regions). In this manner, the update 120 of the second data item 108 by the second server 104, as the sole master 116 of the second data item 108, is propagated to all copies of the data set 106 and is apparent to all servers 104 of the server set 102. The configuration of the server set 102 with a single master 116 for each data item 108 therefore promotes the preservation of the consistency of the data set 106 and reduces or avoids the incidence of data version conflicts caused by mutually exclusive requests 118.

However, the single-master configuration may exhibit a number of deficiencies. Such deficiencies particularly relate to the details of the workload 114, and in particular the performance criteria 122 that are expected of the data set 106.

In many data services, a data set 106 may be provided for may serve a workload 114 that is bound by a set of performance criteria 122. Some workloads 114 may be time-sensitive, where responsiveness is a significant performance criterion of the workload 114; accordingly, the server set 102 may be expected to service the workload 114 in a manner that maintains a low latency, such as a response time within five milliseconds for 99% of read requests and a response time within ten milliseconds for 99% of write requests. A variety of configurations of the server set 102 may be utilized to satisfy this performance criterion 122, such as allocating servers 104 for the workload 114 that are proximate to the clients 112 that are initiating the requests 118 (e.g., provisioning servers 104 for a local news server that are close to a source and/or a demand for the news).

Some workloads 114 may be throughput-sensitive, wherein a particular volume of requests 118 is anticipated (optionally with periodic fluctuation, such as higher volume during business hours, during the work week, or during traditional holiday months). It may be desirable to configure the server set 102 to ensure that the servers 104 are capable of satisfying the anticipated volume of requests 118 at all times. Additionally, some workloads 114 may scale unexpectedly and perhaps rapidly to a greater volume of requests 118, such as a news service that unexpectedly receives a surge in news submissions during an urgent news event. If the resources allocated by the server set 102 for the workload 114 are fixed, then the servers 104 may be unable to handle the surge of requests 118, resulting in a failure of some requests 118 and updates 120 and/or an unavailability to handle the workload 114 for at least some clients 112. It may be desirable to configure the server set 102 with the capability to scale up within a short time frame in order to handle the surge in requests 118 for the workload 114, that, e.g., ensuring that a request by the workload 114 to scale up the capacity that the server set 102 has provided for the workload 114 to a higher level can be accommodated and fulfilled within a few seconds. A variety of configurations of the server set 102 may be utilized to satisfy throughput and scalability performance criteria 122, such as maintaining a reserve of servers 104 in various geographic regions or clusters that are available on-demand to take on a portion of the processing of the workload 114.

Some workloads 114 may be availability-sensitive, wherein the vast majority of requests 118 are to be successfully completed, and wherein an inability to satisfy a request 118 is considered problematic. Availability may also have to be maintained even in the event of a failure of resources of the server set 102, such as a hardware or software failure of a server 104 or a partial network outage. A variety of configurations of the server set 102 may be utilized to satisfy availability performance criteria 122, such as availability verification techniques that rapidly identify an outage and automated failover techniques that rapidly initiate contingency plans in the event of network failure (e.g., automated techniques for selecting a failover master 116 to substitute for a failed server 104, and/or for establishing a configuration of the failover server 104 to accept a transfer of the portion of the workload 114 that was allocated to the failed server 104 as rapidly as possible).

Some workloads 114 may be consistency-sensitive, wherein updates 120 that are occurring in an inadequately synchronized manner may cause parts of the data set 106 to diverge, such as data version conflicts caused by conflicting updates 120 to a single data item 108 or inconsistencies between the values stored in different data items 108 (e.g., a foreign key relationship between a first table and a second table, where the inconsistency comprises a key identifier in the first table that does not correspond to any record in the second table). Such inconsistencies may cause different servers 104 to handle an identical request 118 in different ways due to discrepancies in the local copies of the data set 106 of the workload 114 that are accessed by servers 104 in different locations. For example, a banking service may store a record of an individual's account balance that is simultaneously updated by two different servers 104 with two different updates 120. In some cases, the simultaneous updates 120 may cause one update 120 to be overwritten. In other cases, a data version conflict may be detected, but the servers 104 may be unable to resolve it, or may have to initiate complex journal review and rollback processes to reverse a first update 120 that was committed but that is inconsistent with an also-committed second update 120. Because different workloads 114 may have different sensitivities to data version conflicts, a particular workload 114 may be governed by a consistency performance criterion 122, e.g., a description of the consistency expectations of the workload 114 and/or the semantic details of resolving data version conflicts. In some cases, the performance criterion 122 may involve a selection of a particular consistency model for the data set 106, such as a strong consistency model where all updates 120 are guaranteed to be strictly applied in "wall-clock" order across the entire server set 102; an eventual consistency model, where data sets 106 stored by different servers 104 may temporarily diverge, but are eventually and retrospectively reconciled to exhibit a data set 106 that is consistent up to a certain time point; and a last-write-wins consistency model, wherein loss of past data updates is tolerable as long as the server set stores and provides the most recent update 120.

For a particular workload 114, a data service may formalize some or all of the types of performance criteria 122 noted above—latency, throughput, availability, throughput, scalability, and consistency level—in a service level agreement. The use of a service level agreement may permit an administrator of a workload 114 to specify the performance criteria 122 of the workload 114 and the expectations of the performance of the server set 102, and a guarantee by the providers of the data service of the performance that is to be provided and maintained by the server set 102 for the workload 114. A data service may utilize the service level agreement to guide an administrator in selecting and provisioning a set of data service resources to satisfy the guarantees. Alternatively or additionally, a data service may use the service level agreement to inform an automated process that provisions and configures the resources of the server set 102 to handle the workload 114. Many distributed data services are multi-tenant, such that workloads 114 of various clients 112 are distributed over and concurrently processed by the server set 102, wherein a particular server 104 may consecutively and/or concurrently perform two or more workloads 114 on behalf of two or more clients 112. Such multitenancy scenarios may involve careful configuration of the servers, e.g., to prevent a first workload 114 of a first client 112 from observing and/or interfering with a second workload 114 of a second client 112, and/or to ensure that excessive resource utilization by a first workload 114 does not jeopardize the fulfillment of a service level agreement for a second workload 114.

Some workloads 114 that are constrained by multiple performance criteria 122. For example, some service level agreements may specify different performance criteria 122 for different portions of the workload 114 (e.g., different tasks comprising the workload 114, such as different types of queries that have different performance sensitivities) and/or for different contexts in which a workload 114 is performed (e.g., different performance criteria for peak hours vs. off-hours). Alternatively or additionally, some service level agreements may specify a collection of performance criteria 122, such as both a latency criterion and a consistency level that are both expected of the server set 102. In some cases, different performance criteria 122 may present a tradeoff, wherein fulfilling a first performance guarantee affects the capability of the server set 102 to fulfill a second performance guarantee. In some instances, the concurrent fulfillment of two performance guarantees may be achievable, but may considerably increase the commitment of computational resources relative to the fulfillment of either performance guarantee alone. In other instances, the concurrent fulfillment of two performance guarantees may not be reasonably achievable, or in some cases may be physically impossible with some data service architectures.

An example of a performance criteria tradeoff that may be difficult to fulfill is a workload 114 that expects both low latency and a strong consistency level. A server set 102 may be configured to satisfy the strong consistency level through a single-master configuration in which all updates 120 are routed to a single server 104 that is designated as the master 116 for the data item 108, such as in the example scenario 100 of FIG. 1. However, such propagation may involve an unavoidable network transport delay, based upon technical constraints (e.g., the maximum achievable responsiveness of server and networking hardware) and/or physical constraints (e.g., maximum transmission speeds limited by the speed of light). For example, as illustrated in the example scenario 100 of FIG. 1, a server 104 from the second region may receive an update to the second data item 108 for which the second server 104 in the first region is designated as the master 116. However, the delay in forwarding the fourth request 118 to the second server 104 may introduce enough latency 124 to violate a performance criterion 122 that all updates 120 are to be committed to the data set 106 of the workload 114 by a within a latency bound, such as ten milliseconds. If requests 118 for updates 120 are to be received throughout the world, then the maximum round-trip delay between any selectable server location and the furthest anticipated source of requests 118 for updates 120 may exceed the maximum desired latency 124 according to the performance criterion 122 of the workload 114. In workloads 114 that involve broad-scale geographic distribution and that feature a performance criterion 122 of very low latency 124, it may not be possible to transmit requests 118 from all of the clients to a single master 116 positioned anywhere in the world within the speed-of-light physical constraint. As another example, even if the second server 104 receives a request 118 from a nearby client 112 (such as the second request 118 transmitted by a nearby client 112 to the second server 104) and applies it nearly instantaneously to the data set 106, the propagation of the update 120 to servers 104 in other regions may involve latency 124 that exceeds a latency threshold as a performance criterion 122 of the workload 114.

A single-master configuration may also violate other types of performance criteria 122 of a workload 114 that may be formalized in a service level agreement. As a first such example, a service level agreement may specify an availability-based performance criterion 122 as an expectation of high availability of the workload 114 even in the event of failures, such as hardware failures and network partitioning. However, a single-master configuration represents a single point of failure; e.g., the sole server 104 designated as a master 116 of a particular data item 108 may fail for a variety of reasons, or a network partition may occur between the master 116 of a data item 108 and a client 112 that requests to update 120 the data item 108. While failover techniques may enable the rapid designation of another server 104 as a substitute master 116 for the failed server 104, the transition from the original master 116 to the substitute master 116 may involve a delay, during which requests 118 are unfulfilled in violation of the availability performance criterion 122.

As a second such example, a service level agreement may specify a scalability performance criterion 122 as an expectation that additional resources of the server set 102 may be allocated to handle a surge in requests 118. However, server set configurations involving the designation of a single server 104 as the sole master 116 for a data item 108 may be incompatible with such scalability, as the resources of the server 104 designated as the master 116 may be finite. An administrator of the server set 102 may be able to add resources to the master 116 (such as additional storage or processing capacity), but the available resources that a single server 104 may support may have a fixed limit, such as the maximum clock speed and/or core count of commercially available processors. Alternatively, an administrator may transition the designation of the master 116 from a first server 104 to a second, higher-capacity server 104 that may serve as the new (sole) master 116. However, such transitions may be difficult to implement rapidly, particularly in order to handle a surge of requests 118; e.g., the current master 116 may be operating near maximum capacity to handle the influx of requests 118, and may not have spare resources to initiate transitional processes without jeopardizing the fulfillment of the requests 118. During such transition, the service may become unavailable, which may occur at a particularly sensitive and urgent time for the workload 114.

As a third such example, a service level agreement may specify a consistency level, such as a strong consistency level that ensures that all servers 104 of the server set 102 uniformly agree about the state of a data item 108 at a particular time. Such strong consistency may be achieved by a consensus technique in which the master 116 coordinates the propagation of the prospective update 120 to all servers 104, and the commitment thereby, prior to confirming the application of the update 120 and the fulfillment of the request 118. However, such consensus may be difficult to achieve through the operation of a single server 104 as the master 116; e.g., if the server set 102 includes hundreds or thousands of servers 104, a consistency model that involves concurrent, realtime communication between a single master 116 and hundreds or thousands of other servers distributed over the world may be unachievable, or at least highly inefficient. Moreover, the delay involved in the mediation of a single master 116 with every other server 104 of the server set 102 may be incompatible with other performance criteria 122, such as the commitment of the update 120 within a latency threshold.

Due to such practical constraints, distributed data services based on single-master configurations may be incapable of consistently fulfilling the performance criteria 122 of one or more workloads 114; may violate some performance guarantees, and/or may be unable to offer certain types of service level agreements with performance guarantees that may be violated in some circumstances.

B. Presented Techniques

In view of the limitations of single-master server architectures and the potential problems with data version conflicts and/or performance guarantees that may arise with some multi-master server architectures, the present disclosure provides multi-master configurations of server sets 102 that may promote the extension and/or fulfillment of service level agreements with guarantees for various types of performance criteria 122.

In order to alleviate the performance limitations of a single-master server architecture, a server set 102 may be configured with a multi-master architecture, in which updates 120 to a particular data item 108 may be fulfilled by two or more servers 104 of the server set 102 that are designated as masters 116 of the data item 108. It may be undesirable to designate all servers 104 as masters 116 of the data item 108, such that any server 104 of the server set 102 may apply an update 120 to it; e.g., the resolution of data version conflicts may become unmanageably complicated if every server 104 concurrently applies an update 120 of a different value to the same data item 108. Rather, the designation of a subset of the servers 104 as masters 116 of a particular data item 108 may promote the fulfillment of performance criteria 122, such as latency, scalability, availability, and consistency, without creating complexity and/or inefficiency that may diminish the capability of the server set 102 to apply updates 120 to the data set 106. As one example, for each broad geographic region (e.g., Africa, Asia, Europe, and North America), a selected server 104 may be designated as a regional master 116, and all updates 120 received within a particular region may be forwarded to the regional master 116 for application to the data set 106.

The designation of a subset of servers 104 as masters 116 may promote the offering and/or fulfillment of performance criteria 122 that may not be offered and/or fulfilled in other configurations. For example, a latency performance criterion 122 of updates 120 to the data set 106 may be unattainable with a single server 104 designated as the master 116; e.g., because the master 116 may be overloaded with requests 118 for updates 120 and may not be able to apply an update 120 within a latency threshold. Moreover, the latency performance criterion 122 may also be unattainable by designating every server 104 as a master 116, as verifying the commitment of the update 120 by every server 104 may also exceed the latency threshold. However, designating a subset of at least two servers 104 $pf$ the server set 102 as masters 116 of the data item 108 may balance the availability of masters 116 to apply an update 120 to the data set 106 with the expedient verification that the update 120 has been committed over the server set 102 (e.g., verification that the subset of servers 104 designated as masters 116 are in agreement as to the state of the data item 108 before and/or after the update 120), thereby fulfilling performance criteria 122 that a single-master server set 102 may be unable to offer and/or fulfill.

Figure 2:
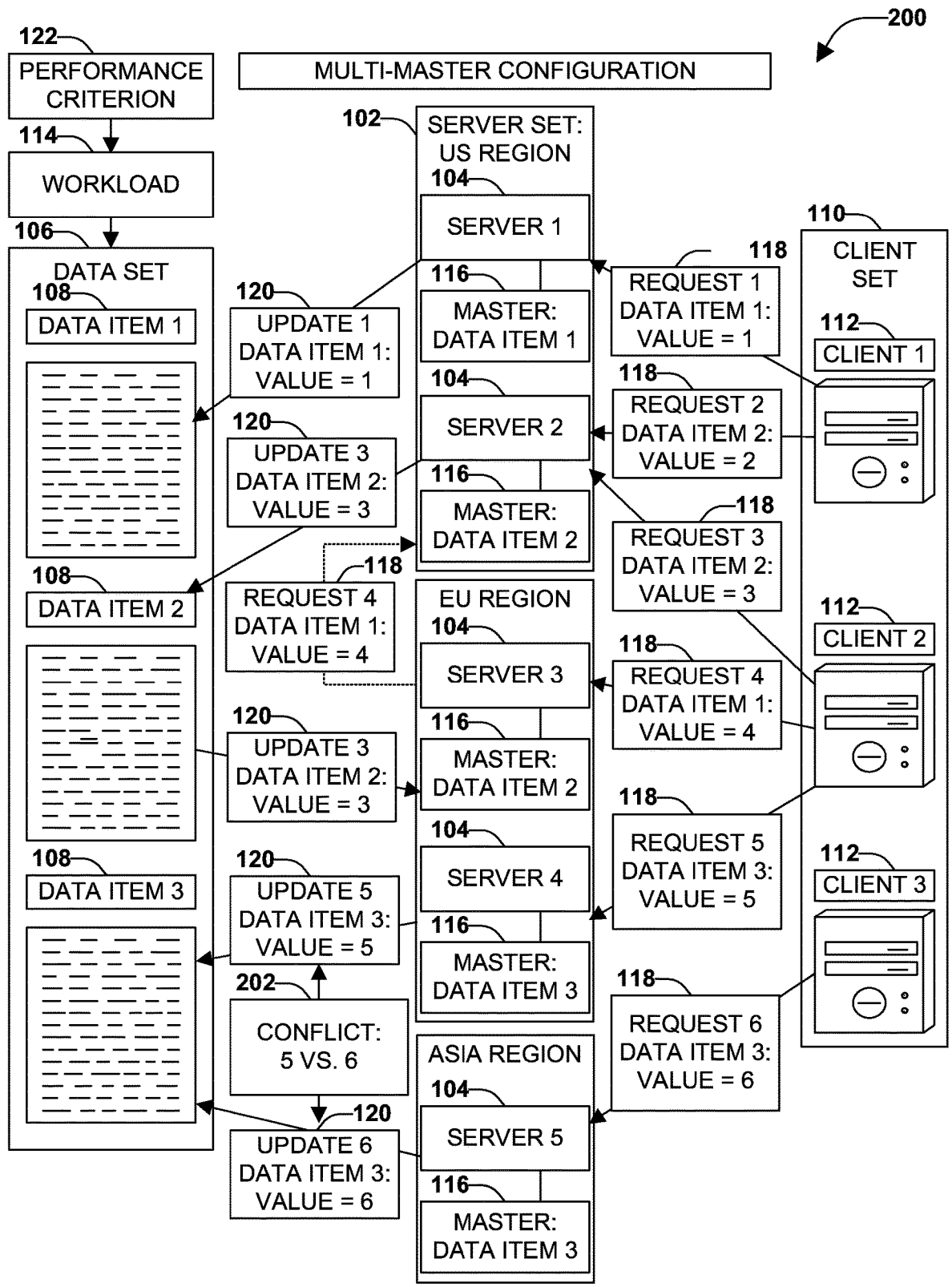
FIG. 2 is an illustration of an example scenario featuring a multi-master configuration of a server set in accordance with the techniques presented herein.

FIG. 2 is an illustration of an example scenario 200 featuring a multi-master configuration of a server set 102 in accordance with the techniques presented herein. In this example scenario 200, a server set 102 is provided that spans three regions, and where the server set 102 is organized to serve a data set 106 to a client set 110 of clients 112 in the context of a workload 114 that is constrained by a performance criterion 122, such as latency, throughput, scalability, availability, and/or consistency. In order to provide the workload 114 in a manner that is consistent with the performance criterion 122, the server set 102 may be partitioned, for each data item 108, into a master subset of at least two servers 104 that are permitted to update the data item 108 and a non-master subset of servers 104 that are not permitted to update the data item 108. For example, among the five server 104 illustrated in the example scenario 200 of FIG. 2, the second data item 108 may be updated only by the second server 104 and the third server 104, while the third data item 108 may be updated only by the fourth server 104 and the fifth server 104.

When a request 118 is received by a server 104 to read the data item 108, the server 104 may simply access the data item 108 to read the data item 108 and may provide information to the client 112 based on the reading. However, when a request 118 is received by the server 104 to apply an update 120 to the data item 108, the server 104 may determine the identity of the masters 116 of the data item 108 involved in the request 118. If the server 104 determines that it has been designated as a master 116 of the data item 108, the server 104 applies the requested update 120 to the data set 106 to fulfill the request 118, and then propagates the update to at least one other server 104 of the server set 102 (e.g., forwarding the update 120 to each other master 116, and/or to at least one server 104 in each geographic region). The other servers 104 that receive the update 120 may ensure that the update 120 is applied to the local copy of the data set 106, and/or may propagate the update 120 to other servers (e.g., the other servers 104 within the same geographic region). If the server 104 determines that it has not been designated as a master 116 of the update 120, the server 104 forwards the request 118 to a master 116 of the server set 102 for the data item 108, and the master 116 applies the update 120 to the server set 102.

For example, in the example scenario 200 of FIG. 2, a first request 118 for an update 120 of a first data item 108 is sent to a first server 104. The first server 104 determines that it has been designated as a master 116 for the first data item 108, applies the update 120 to the data set 106 to fulfill the request 118, and propagates the update 120 to at least one other server 104 of the server set 102 (e.g., to one server 104 in each region, and/or to at least one other server 104 that has been designated as a master 116 for the first data item 108). However, when a fourth request 118 is issued by a client 112 to a third server 104 that has not been designated as a master 116 of the first data item 108, the third server 104 does not apply the update 120 to the first data item 108, but rather forwards the request 118 to another server 104 that has been designated as a master 116 for the second data item 108 (e.g., to the first server 104 in the first region).

As another example in the example scenario 200 of FIG. 2, a second server 104 receives, from different clients 112, a second request 118 and a third request 118 to update a second data item 108. The second server 104 determines that it has been designated as a master 116 of the second data item 108, and also that the application of the requests 118 may create a data version conflict. The second server 104 therefore performs a data version conflict resolution technique to resolve the data version conflict, and selects the third request 118, opting to refuse the second request 118. The second server 104 applies an update 120 to the data set 106 to fulfill the second request 118 and propagates the update 120 to at least one other server 104 of the server set 102.

As a third example in the example scenario 200 of FIG. 2, a fourth server 104 and a fifth server 104, deployed within different regions, are designated as masters 116 of a third data item 108 in the data set 106. Each master 116 concurrently receives a request 118 from a different client 112 to update the third data item 108 to a value. Because each server 104 is designated as a master 116, the servers 104 apply updates 120 to the third data item 108 (e.g., each server applying the update 120 to a local copy of the third data item 108 for the geographic region). Each master 116 also propagates its updates 120 to other servers 104 of the server set 102. When one of the masters 116 discovers that the other master 116 has also applied an update 120 to the third data item 108, the master 116 compares the updates 120 and determines that a data version conflict 202 has arisen: different subsets of the servers 104 concurrently perceive the third data item 108 as having different, conflicting values, based on which of the updates 120 has been most recently applied to the third data item 108. The data version conflict 202 may arise, e.g., because the fourth server 104 commits the fifth update 120 to of the local copy of the third data item 108 for the EU region, while, concurrently, the fifth server commits the sixth update 120 to the local copy of the third data item 108 for the Asia region. As another example, the updates may have both been committed, but in a different order; e.g., the EU region and the Asia region may both commit the fifth update 120 of the third data item 108 before the sixth update 120, but the servers 104 in the U.S. region may have been notified of the updates 120 in a reverse order, and may have applied the sixth update 120 before the fifth update 120 to the local copy of the third data item 108 for the U.S. region. Moreover, the data version conflict 202 does not reflect an ordinary and ephemeral discrepancy that is resolvable within a latency threshold; rather, because the sequence of updates 120 applied to one version of the third data item 108 differs from the sequence of updates 120 applied to another version of the data item 108, the discrepancy reflects a genuine inconsistency among the versions of the third data item 108 in the distributed data set 106. Accordingly, one of the masters 116 applies a data version conflict resolution technique to choose among the competing updates 120 (e.g., a selection of one update 120 and a discarding of another update 120; a canonical sequence in which the updates 120 are to be applied; and/or a superseding update 120 that merges and takes precedence over all such updates 120). Alternatively, the master 116 may request a rollback of all such updates 120 and revert the third data item 108 to its state before either of the committed updates 120. In this manner, the master 116 may enable a rapid resolution of the data version conflict 202, and may propagate the data version conflict resolution outcome to one or more of the other servers 104 for application to the data set 106 to resolve the data version conflict 202. In this manner, the server set 102 may be organized to provide access to the data set 106 on behalf of the client set 110 in the service of the workload 114 in accordance with the techniques presented herein.

C. Technical Effects

The organization of a server set in accordance with the techniques presented herein may enable a variety of technical effects in some embodiments thereof.

A first example of a technical effect that may be achieved through the multi-master techniques presented herein involves the provision of a server set 102 that is capable of fulfilling performance criteria 122 that may not be achieved by single-master server sets 102.

As a first example, a multi-master server set 102 may be capable of offering and fulfilling a latency performance criterion 122, such as a maximum latency threshold within which updates 120 are to be applied. By providing at least two masters 116 that are permitted to update a data item 108 of the data set 106, the server set 102 is capable of initiating the application of an update 120 to the data set 106 by multiple servers, one of which is likely to be closer to the client 112 initiating the request 118 for the update 120, and/or one of which is less likely to be completing a computational load that forestalls the initiation of the update 120. Additionally, the provision of multiple masters 116 may enable the update 120 to be committed across the entire data set 106 more rapidly (e.g., each master 116 may serve as a transaction coordinator for the local copy of the data set 106 in a geographic region, and/or may coordinate the propagation of the update to the other servers 104 within the region). Such concurrent commitment of the update 120 to the various copies of the data set 106 and propagation to all servers 104 of the server set 102 is likely to be faster than the commitment of the update 120 by a single master 116 to all local copies of the data set 106 through all regions, and/or the propagation of the update 120 from the single master 116 to all other servers 104 of the server set 102. Conversely, the designation of only some servers 104 as masters 116 for a particular data item (wherein at least one server 104 is designated as a non-master that is not permitted to update the data item 108) reduces the number of masters 116 that are involved in the commitment, and may therefore be faster than an all-master server configuration. In this manner, the partitioning of the server set 102 into a master subset (comprising at least two masters 116) and a non-master subset (comprising at least one non-master server 104) for a particular data item 108 may promote compliance with a latency threshold, whereas other configurations may be incapable of doing so.

As a second such example, a multi-master server set 102 may be capable of offering and fulfilling a throughput performance criterion 122, such as an anticipated volume of requests 118 for updates 120 to be handled within a particular unit of time. The designation of at least two masters 116 enables updates 120 of a data item 108 to be concurrently applied by multiple servers 104, and may therefore be capable of greater overall volume and throughput than a single-server configuration in which all updates 120 are applied by a sole master 116. In this manner, multi-master server configurations may enable a parallelized application of updates 120 to the data set 106, in a manner that raises the throughput of the server set 102 for updating the respective data items 108 of the data set 106, as compared with a single-master server set 102.

As a third such example, a multi-master server set 102 may be capable of offering and fulfilling a scalability performance criterion 122, such as a capability of the server set 102 to scale up the resources provided for the workload 114 to handle a surge in requests 118. A single-master server set architecture may exhibit limited options for responding to such surges, e.g., offloading other workloads 114 performed by the single master 116, increasing its computational capacity to a maximum (e.g., maximizing the clock rate and/or core count of processors), and/or by allocating more resources to the single master 116, such as more plentiful network capacity or a more comprehensive network cache. However, the scalability options are limited to the maximum throughput of the single master 116, which may have hard limits established by the microarchitecture of the server 104, such as a maximum processor clock rate or core count, a maximum of installed physical memory, and a maximum bus capacity between the processor and peripheral devices. By contrast, a multi-master server set may respond to a surge in requests 118 not only by expanding the resources of the individual masters 116 of the master subset, but also by adjusting the partitioning between the master subset and the non-master subset for the data item 108, e.g., allocating additional masters 116 for a data item 108, and/or by moving a designation of masters 116 for a data item 108 to locations that are nearer the sources of the requests 118. Such allocation may occur while the previously designated masters 116 continue to fulfill requests 118, thereby maintaining the current capacity of the server set 102 while, concurrently, new masters 116 are being provisioned to alleviate the existing masters 116 of surging demand. In this manner, the multi-master server set 102 may be more capable of scaling up to meet a surge in demand for the workload 114 than single-master configurations of the server set 102.

As a fourth such example, a multi-master server set 102 may be capable of offering and fulfilling an availability performance criterion 122, such as a maximum uptime for the server set 102 to fulfill requests 118 to update the workload 114. A single-master configuration presents a single point of failure; e.g., if the sole master 116 for a data item 108 experiences a failure, the server set 102 incurs a delay in detecting and resolving the unavailability of the sole master 116, during which the service provided to or by the workload 114 is unavailable to the clients 112. A multi-master configuration comprising at least two masters 116 of the respective data items 108 is resilient to the failure of a master 116; in the event of a failure of one or even several masters 116, at least one master 116 remains available to apply updates 120 to the data item 108. That is, other than a scenario in which all of the masters 116 for a particular data item 108 fail, the consequence of a failure of a master 116 is not a failure of availability, but a modest increase in latency as the other masters 116 for the data item 108 handle the volume of requests 118 that the failed master 116 have been fulfilling, while a substitute master 116 is provisioned and instantiated to take the place of the failed master 116. In this manner, the multi-master server set 102 may therefore capable of offering and fulfilling stricter availability performance criteria than a single-master server set 102.

As a fifth such example, a multi-master configuration of a server set 102 may be capable of offering and fulfilling a consistency performance guarantee, such as a consistency model that is difficult to achieve in a single-master set. For instance, a strong consistency model may involve a strict commitment of updates 120 across the entire server set 102, such as a unanimous agreement by all servers 104 that an update 120 has been applied to the data item 108 to bring it to a final state, before providing a response to a client 112 that the request 118 for the update 120 has succeeded. A single-master configuration may be quite difficult to fulfill a strong consistency model, e.g., due to the difficulty of positioning a single master 116 as a global transaction coordinator for hundreds or even thousands of servers 104 comprising a widely distributed server set 102. However, a multi-master server configuration may enable the master subset of servers 104 designated as masters 116 (e.g., for each geographic region) to perform a local commit of the update 120 to a local copy of the data set 106 in conjunction with a selection of the non-master servers 104 (e.g., the non-master servers 104 within the same geographic region), and the masters 116 may then perform a second-level distributed consensus to verify the commitment by each master 116. The enhanced parallelism of the distributed commitment of the update 120 across the entire server set 102 may be more readily achievable than coordination by a single master 116. As another example, a session-based consistency model may involve a commitment of updates 120 to a data item 108 that is consistent within a session, although versions of the data item 108 may vary between sessions. Such an intermediate consistency model may be stricter than an eventual consistency model in which updates 120 are only guaranteed to settle into consistency at an indefinite future time point, and yet less rigorous than a strong consistency model, such that requests 118 may be fulfilled within a tighter latency threshold, enabling the data set 106 and the workload 114 to be more responsive to the client set 110. A single-master server set may be difficult to reconcile with a session-based consistency model, but a multi-master server set, in which respective masters 116 may maintain the state of a session for a group of non-master servers 104, may be suitable for such a consistency model.

These and other performance criteria 122 may be satisfied by a server set 102 configured in accordance with the techniques presented herein. Moreover, the server set 102 may be testable and demonstrable of being consistently capable of satisfying various performance criteria 122, such that a guarantee of such capabilities may be extended to a provider of a workload 114 that depends upon such performance criteria 122. Moreover, confidence in the reliability of a guarantee may promote the formulation of a service level agreement that sets forth the performance criteria 122 upon which the workload 114 depends, and the server set 102 may be offered as a platform that is capable of providing guarantees of the satisfaction of such performance criteria 122. Such features are promoted by the multi-master configuration of the server set 102 in accordance with the techniques presented herein.

A second example of a technical effect that may be achieved through the multi-master techniques presented herein involves the resolution of data version conflicts 202 that may arise within the data set 106. The configuration of the server set 102 with multiple masters 116 may avoid some sources of data version conflicts 202, such as multiple, potentially conflicting requests 118 that are routed to the same master 116 (such as the second request 118 and the third request 118 that are resolved by the second server 104 as a master 116 for the second data item 108). However, multi-master server configurations raise the prospect of such conflicting requests 118 arriving at different masters 116, each of which commits an update 120 to the data set 106 that conflicts with the commit by the other master 116 in response to the other request 118. In some cases, the concurrently applied updates 120 may be mutually compatible; e.g., the data item 108 may store an unordered set of added items, and concurrent updates 120 may result in the addition of all such updates 120 to the unordered set that produces different, but logically equivalent, versions of the data item 108 by different servers 104. In other cases, the mutually applied updates 120 may be mutually incompatible and may create a data version conflict 202. Each of the multiple masters 116 may be configured to detect and resolve data version conflicts 202 through a variety of data version conflict resolution techniques, which identify a data version conflict resolution outcome and propagate the same throughout the sever set 102 (e.g., propagating a notification of the data version conflict 202 and the elected outcome thereof to the at least one other master 116 of the server set 102 for the selected data item 108). The organization of the server set 102 as a partitioning of the servers 104 into a master subset with at least two masters 116 and a non-master subset with at least one non-master server 104, in accordance with the techniques presented herein, may reduce the incidence of data version conflicts 202 by consolidating updates into the subset of master servers 104, and by limiting the number of concurrent and mutually inconsistent updates 120 that are being applied by the server set 102.

Additionally, in some embodiments, the multi-master architecture may be extended to provide a mechanism for detecting and resolving data version conflicts 202, such as demonstrated by the fourth server 104 and the fifth server 104 as masters of the third data item 108 in the example scenario 200 of FIG. 2. In some embodiments, among the masters 116 in the master subset for a data item 108, one such master 116 may be designated as a merging master that applies data version conflict resolution techniques to resolve data version conflicts 202; e.g., other masters 116 may notify the merging master 116 of a detected data version conflict 202 and may rely on the merging master 116 to resolve the data version conflict 202. The merging master may do so by identifying a data version conflict resolution outcome, such as a superseding update 120 to the data item 108 that resolves the data version conflict 202, and may propagate the data version conflict resolution outcome to the other masters 116 for application to the data set 106 to resolve the data version conflict 202 throughout the server set 102. Such techniques may leverage the multi-master organization provided in accordance with the techniques presented herein.

A third example of a technical effect that may be achieved through the multi-master techniques presented herein involves the administration and load-balancing of the server set 102 to handle the workload 114. In single-master configurations, the server set 102 routes all requests 118 for updates 120 to a data item 108 through a single server 104 that is designated as the master 116. If the data item 108 is frequently updated, the computational load of processing all such updates 120—particularly in a manner that reduces or avoids data version conflicts 202, and particularly if the schema of the data set 106 is complex, which may involve a complex logic for determining whether an update 120 presents a data version conflict 202—may be substantial. Even if the volume of such updates 120 is large, a single-master configuration of the server set 102 is not compatible with a distribution of the load over a subset of the servers 104. In accordance with the present disclosure, a multi-master configuration may enable the selection of masters 116 that distribute the computational load, while also providing a mechanism to detect and resolve data version conflicts. Moreover, the multi-master capability enables a selection of masters 116 in locations that are closely related to anticipated demand for the workload 114, such as identifying locations that are likely to be high-volume sources of requests 118 and selecting one or more masters 116 that are geographically near such locations. In some embodiments, the selection of masters 116 may be dynamic, such that changes in load, both anticipated (e.g., according to a predictable schedule or event) and/or or unanticipated (e.g., according to an unforeseen event) may enable a proactive and/or reactive repartitioning of the server set 102 to add or relocate one or more masters 116 to servers 104 that are nearer the new sources of updates 120. Such flexibility may be greater than for A third example of a technical effect that may be achieved through the multi-master techniques presented herein involves the quality of service provided to different clients 112 of a client set 110 of the workload 114. In some scenarios, such as online gaming, updates 120 by different clients 112 may be competitive, and the order in which requests 118 are processed may confer an advantage upon a first client 112 whose requests 118 are processed faster and a disadvantage upon a second client 112 whose requests 118 are processed slower. In single-master configurations, the selection of the location of the server 104 designated as the master 116 for a data item 108 may have a differential impact upon the client set 110, where clients 112 that are geographically near the master 116 may have updates 120 processed rapidly and successfully, but updates 120 requested by clients 112 that are geographically distant from the master 116 may be processed with substantial latency 124 and possibly a significant rate of failure (e.g., if updates 120 are processed in the order received by the master 116, updates 120 submitted by distant clients 112 may be processed after updates 120 by nearby clients 112 that are simultaneously generated but transmitted more quickly to the master 116. In scenarios where the timing of updates 120 is a significant factor, including scenarios in which updates 120 by different clients 112 are competitive (e.g., in online gaming), clients 112 may perceive an unintended and possibly unfair advantage or disadvantage based on distance to the single master 116. Multi-master configurations may enable the subset of servers 104 designated as masters 116 to be selected such that the latency 124 experienced by each client 112 in the processing of requests 118 is more consistent across the client set 110, reducing unintended advantages and disadvantages based on proximity of clients 112 to servers 104. Many such technical effects may be achieved through multi-master configurations of server sets 102 in accordance with the techniques presented herein.

D. Primary Embodiments

The techniques presented herein may be implemented as various embodiments that may take many forms. Some example embodiments are illustrated in FIGS. 3-6.

Figure 3:
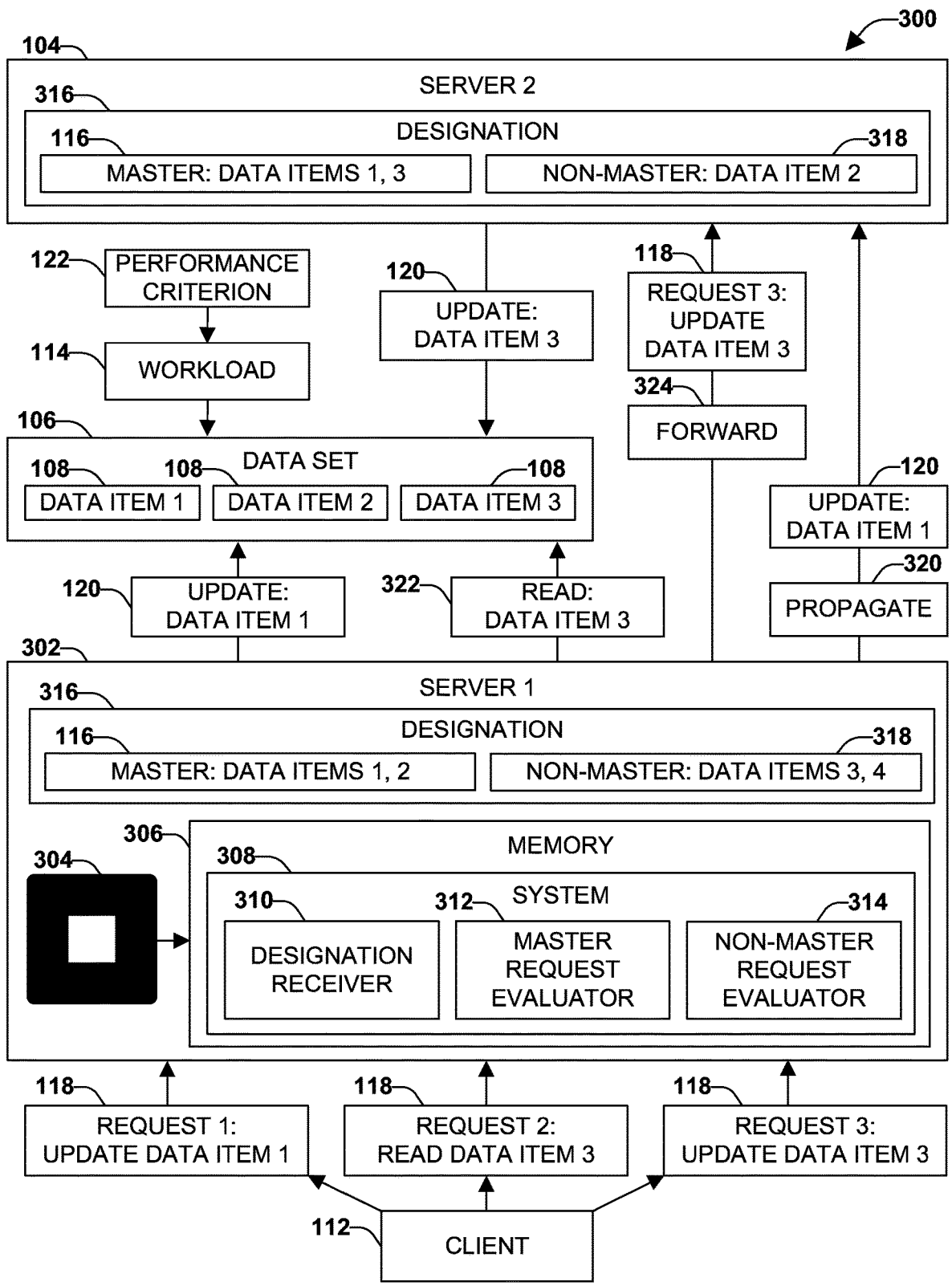
FIG. 3 is a component block diagram illustrating an example server featuring an example system for configuring a server to provide a data set in accordance with the techniques presented herein.

FIG. 3 is an illustration of an example scenario featuring embodiments of the techniques presented herein, including an example server 302 that is configured to provide access to a data set 106 in accordance with the techniques presented herein and an example system 308 that causes an example server 302 to provide access to a data set 106 in accordance with the techniques presented herein. The example server 302 may comprises, e.g., a processor 304 and a volatile or nonvolatile memory 306 (e.g., a volatile system memory circuit, a platter of a hard disk drive, a solid-state storage device, and/or an magnetic and/or optical computer-readable medium), wherein the memory 306 stores instructions components of an example system 308 that cause the example server 302 to implement at least a portion of the techniques presented herein. The example system 308 may comprise, e.g., instructions stored in a volatile or nonvolatile memory 306 (e.g., a volatile system memory circuit, a platter of a hard disk drive, a solid-state storage device, and/or an magnetic and/or optical computer-readable medium), wherein the execution of the instructions by a processor 304 of the example server 302 causes the instantiation of a set of components, wherein respective components of the example system 308 implement a portion of the techniques presented herein, and wherein the interoperation of the components causes the example server 302 to operate in accordance with the techniques presented herein.

In this example scenario 300, a server set 102, comprising the example server 302 and a second server 104, provides access to a data set 106 comprising a set of data items 108 on behalf of a workload 114, which may depend upon one or more performance criteria 122, such as a latency threshold; an expected volume of requests 118; a scalability capability of handling an expected or unexpected surge in requests 118; an availability threshold; and/or a consistency level, including a consistency model. The workload 114 may also define a set of logical constraints of the data set 106, such as criteria by which the logical consistency and/or inconsistency of the data set 106 is to be evaluated, such as a schema of the data set 106 or a set of business logic or rules to validate the data set 106. The server set 102 provides access to the data set 106 to a client 112 that issues a series of requests 118 that involve various data items 108 of the data set 106, and the example server 302, together with the second server 104, endeavors to fulfill the requests 118 in accordance with the techniques presented herein.

The example system 308 of the example server 302 comprises a designation receiver 310, which receives a designation 316 of the server for respective data items 108 of the data set 106. The designations 316 for the respective data items 108 are selected from a designation set comprising a master 116 that is permitted to update the data item 108 and a non-master 318 that is not permitted to update the data item 108. In accordance with the multi-master configuration of the server set, for the respective data items 108, at least one other server 104 of the server set 102 has been designated as a second master 116 that is also permitted to update the data item 108. In this example scenario 300, the data set 106 comprises three data items 108, and the example server 302 has been designated as a master 318 for the first and second data items 108 and as a non-master for the third data item 108. Additionally, the second server 104 has been designated as a master 116 for the first and third data items 108 and as a non-master for the second data item 108.

The example server 302 receives a set of three requests 118 from the client 112. The first request 118 involves an update 120 of the first data item 108. In accordance with the techniques presented herein, the example server 302 examines its designations 316 and determines that it has been designated as a master 116 for the first data item 108. Accordingly, the example server 302 fulfills the request 118 by invoking a master request evaluator 312 of the example system 308, which applies an update 120 of the first item 108 to the data set 106. The master request evaluator 312 also propagates 320 the update 120 of the first data item 108 to the second server 104, which, as it is also a master 116 of the first data item 108, may compare the update 120 with other updates 120 of the first data item 108 that it has previously or concurrently applied in order to detect a data version conflict, which may be resolved by a variety of techniques, some of which are also presented herein. Additionally (and optionally before or after verifying that data version conflicts do not exist or have been resolved), the example server 302 may notify the client 112 of the successful application of the update 120 of the first data item 108.

The example server 302 also receives a second request 118 from the client 112 that involves a read of the third data item 108. Since the request 118 only involves a read operation and not a write operation, the example server 302 is permitted to fulfill the request 118 irrespective of its designation 316 as a master 116 or non-master 318 with respect to the third data item 108. Accordingly, the example server 302 applies a read operation 322 to the data set 106 to retrieve the requested portion of the third data item 108 and returns the data to the client 112.

The example server 302 also receives a third request 118 form the client 112 that involves an update of the third data item 108. The example server examines its designations 316 and determines that it has been designated as a non-master 318 for the third data item 108, and therefore is not permitted to fulfill the request by updating the third data item 108. Instead, the non-master request evaluator 312 of the example system 308 identifies another server 104 of the server set 102 that has been designated as a master 116 of the third data item 108—i.e., the second server 104—and forwards 324 the request 118 to the second server 104. In accordance with its designation as a master 116 of the third data item 108, the second server 104 applies the update 120 to the third data item 108. The non-master request evaluator 314 may receive from the second server 104 an acknowledgment of the update 120 of the third data item 108 and/or may examine the data set 106 to verify that the update 120 has been applied to the third data item 108, and may therefore report the fulfillment of the request 118 to the client 112. In this manner, the example server 302 provides access to the data set 106 on behalf of the workload as a member of a multi-master server set 102 configured in accordance with the techniques presented herein.

Figure 4:
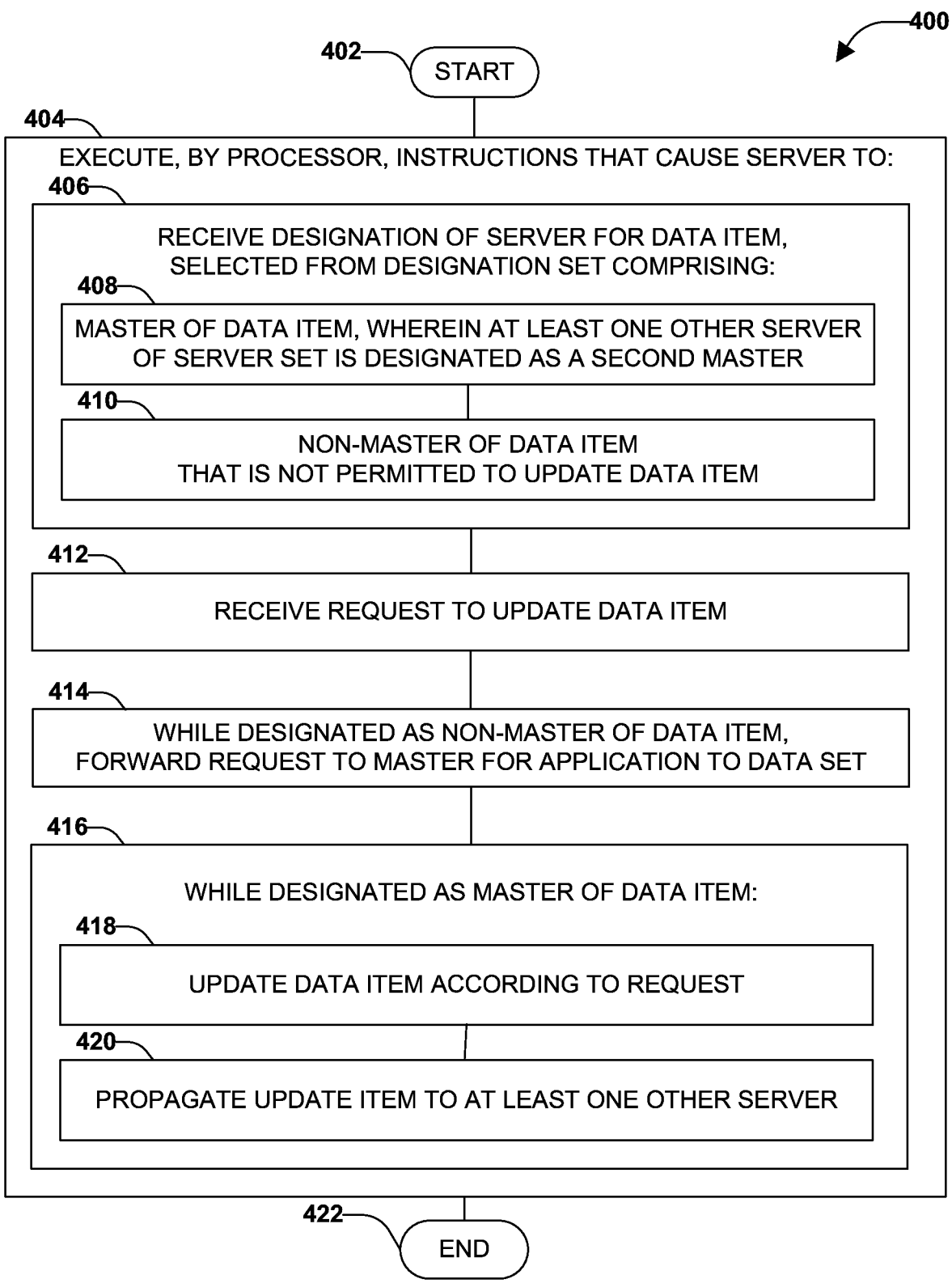
FIG. 4 is an illustration of an example method of configuring a server of a server set to process a workload in accordance with the techniques presented herein.

FIG. 4 is an illustration of an example method 400 of configuring a server 104 of a server set 102 to provide access to a data set 106 on behalf of a workload 114 in accordance with the techniques presented herein. The example method 400 may be implemented, e.g., as a set of instructions stored in a volatile or nonvolatile memory of a server, such as a system memory circuit, a platter of a hard disk drive, a solid-state storage device, and/or an magnetic and/or optical computer-readable medium, wherein execution of the instructions by a processor 304 of the server 104 causes the server 104 to operate in accordance with the techniques presented herein.

The example method 400 begins at 402 and involves executing 404 the instructions by the processor 304 of the server 104. In particular, execution of the instructions causes the server 104 to receive 406 a designation 316 of a data item 108 of the data set 106, wherein the designation 316 is selected from a designation set comprising a master designation 408 as a master 116 that is permitted to update the data item 108 and a non-master designation 410 as a non-master 318 that is not permitted to update the data item 108, and wherein the server set 102 comprises at least one other server 104 has been designated as a second master 116 of the data item 108. Execution of the instructions also causes the server 104 to receive 412 a request 118 to update the data item 108. Execution of the instructions also causes the server 104 to, while designated as a non-master 318 of the data item 108, forward 414 the request 118 to another server 104 of the server set 102 that has been designated as a master 116 of the data item 108, so that the master 116 may update 120 the data item 108 to fulfill the request 118. Execution of the instructions also causes the server 104 to, while designated 416 as a master 116 of the data item 108, update 418 the data item 108 according to the request 118, and propagate 420 the update 120 of the data item 108 to at least one other server 104 of the server set 102. In this manner, the example method 400 causes the server 104 to operate in accordance with the techniques presented herein, and so ends at 422.

Figure 5:
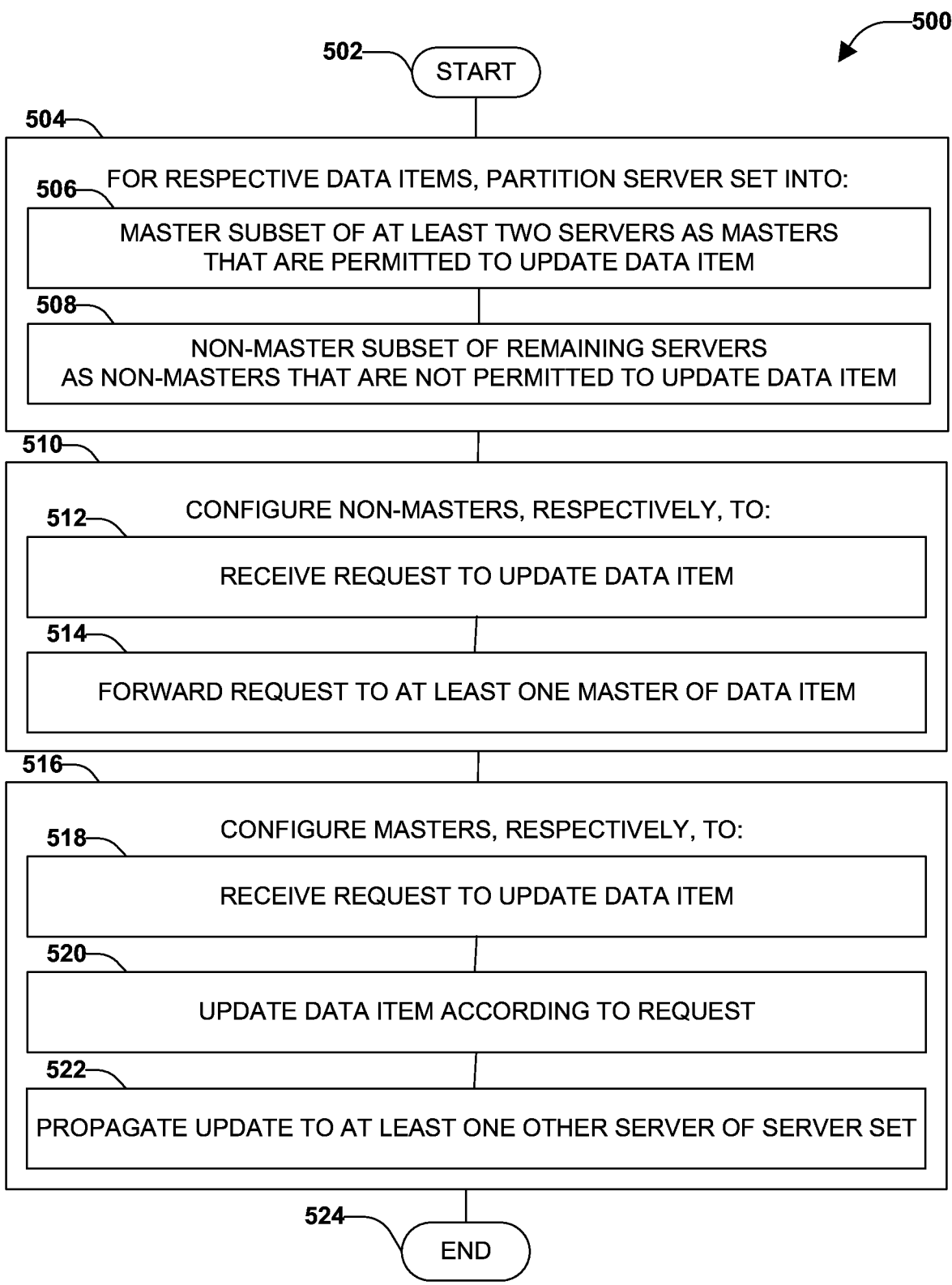
FIG. 5 is an illustration of an example method of configuring a server set to process a workload in accordance with the techniques presented herein.

FIG. 5 is an illustration of an example method 500 of configuring a server set 102 to provide access to a data set 106 on behalf of a workload 114 in accordance with the techniques presented herein, wherein the workload 114 involves a set of one or more performance criteria 122. The example method 500 may be implemented, e.g., as a set of instructions stored in a volatile or nonvolatile memory of one or more servers 104, such as a system memory circuit, a platter of a hard disk drive, a solid-state storage device, and/or an magnetic and/or optical computer-readable medium, wherein execution of the instructions by a processor 304 of the server 104 causes respective servers 104 to operate in accordance with the techniques presented herein.

The example method 500 begins at 502 and involves, for respective data items 108 of the data set 106, partitioning 504 the server set 102 into a master subset 506 comprising at least two servers 104 designated as masters 116 that are permitted to update the data item 108 and a non-master subset 508 comprising at least one server 104 designated as a non-master 318 that is not permitted to update the data item 108, and wherein the partitioning 504 enables the server set 102 to fulfill the performance criteria 122 of the workload 114. The example method 500 further comprises configuring 510 the servers 104 that have been designated as non-masters 318, respectively, to receive 512 a request 118 to update 120 the data item 108 and forward 514 the request 118 to another server 104 of the server set 102 that has been designated as a master 116 of the data item 108. The example method 500 further comprises configuring 516 the at least two masters 116, respectively, to receive 518 the request 118 to update 120 the data item 108; update 520 the data item 108 according to the request 118; and propagate 522 the update 120 of the data item 108 to at least one other server 104 of the data set 102. In this manner, the example method 500 of FIG. 5 enables the server set 102 to provide access to the data set 106 on behalf of the workload 114 in accordance with the techniques presented herein, and so ends at 524.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 6:
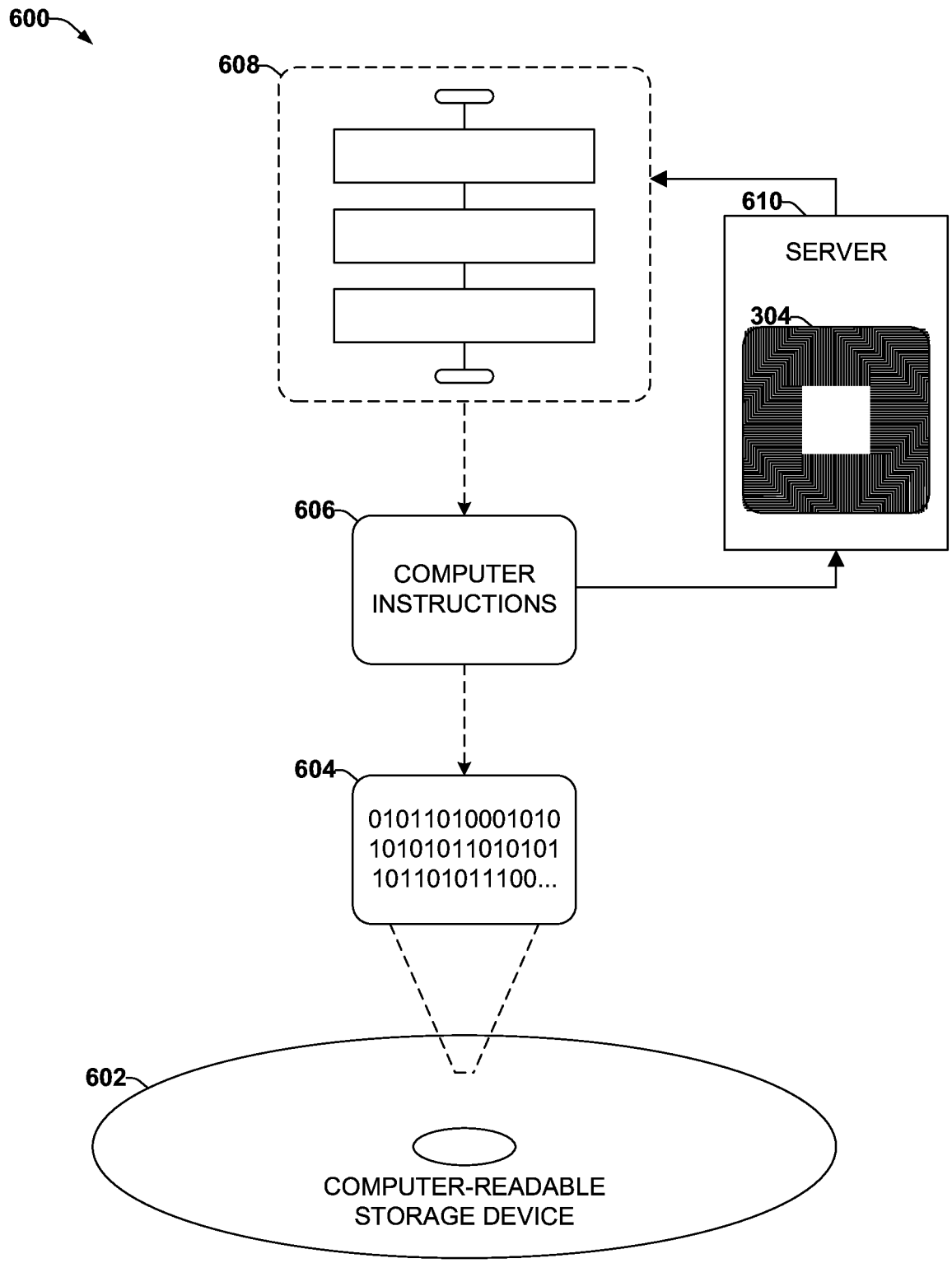
FIG. 6 is an illustration of an example computer-readable storage device storing instructions that, when executed by a processor of a server of a multi-master server set, cause the server to provide access to a data set on behalf of a workload in accordance with the techniques presented herein.

An example computer-readable medium that may be devised in these ways is illustrated in FIG. 6, wherein the implementation 600 comprises a computer-readable memory device 602 (e.g., a CD-R, DVD-R, or a platter of a hard disk drive), on which is encoded computer-readable data 604. This computer-readable data 604 in turn comprises a set of computer instructions 606 that, when executed on a processor 304 of a server 610, provide an embodiment 608 that causes the server 610 to operate according to the principles set forth herein. For example, the processor-executable instructions 606 may encode a system that causes a server 104 to provide access to a data set 106 on behalf of a workload 114, such as the example server 302 and/or the example system 308 of FIG. 3. As another example, the processor-executable instructions 606 may encode a method of providing access to a data set 106 on behalf of a workload 114, such as the example method 400 of FIG. 4 and/or the example method 500 of FIG. 5. Many such embodiments may implement various portions of the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

E1. Scenarios

As a first variation of this first aspect, the currently presented techniques may be utilized with various types of servers 104 and server sets 102. For example, the presented techniques may be utilized with a variety of servers 104, such as workstations, laptops, consoles, tablets, phones, portable media and/or game players, embedded systems, appliances, vehicles, and wearable devices. The server set 102 may comprise a collection of server units, such as a collection of server processes executing on a device; a personal group of interoperating devices of a user; a local collection of server units comprising a computing cluster; and/or a geographically distributed collection of server units that span a region, including a global-scale distributed database. Such servers 104 may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication).

As a second variation of this first aspect, the currently presented techniques may be utilized with a variety of data sets 106 and workloads 114 that are processed by the server set 102. Such data sets 106 may include databases of various types, including relational databases such as SQL, object graph databases, and key/value store databases, as well as mixed-modality databases that support various data structures and/or query languages. The presented techniques may be utilized with a variety of data sets 106 featuring a variety of data models, such as a relational database comprising tabular data organized into tables comprising sets of attributes and sets of rows presenting values for the respective attributes; graph data comprising a graph of nodes with interconnecting edges; key/value pairs of keys and associated values; and documents provided as structured or unstructured collections of entities. Some data sets 106 may comprise a hybrid of several data models, which may be aggregated in a horizontal manner (e.g., a collection of items of which some items are provided and/or requested in a first native item format, such as relational data, and other items are provided and/or requested in a second native item format, such as entities within documents) and/or non-horizontal manner (e.g., a collection of items in a first native item format, such as entities within documents, may be described by metadata represented by other items provided in a second native item format, such as relational data). The workloads 114 utilizing such data sets 106 may include, e.g., websites; web services; microservices; computing environments provided to various devices; data processing services, such as image processing, data mining, and/or artificial intelligence services; and/or local or remote applications, such as games. Such data sets 106 and workloads 114 may be used in a variety of circumstances, such as data warehousing; content provided through a content system such as a webserver; and object systems for an application or operating system. Additionally, such data sets 106 and workloads 114 may be provided by, provided for, accessed by, and/or processed on behalf of a variety of clients 112, such as a client process on a server storing the data set; other servers within the server set; and/or various client devices that utilize the server set on behalf of one or more users and/or other devices. Many such scenarios may be identified in which the techniques presented herein may be advantageously utilized.

As a second variation of this first aspect, the currently presented techniques may be utilized with a variety of performance criteria 122, which may be formalized in service level agreements. Such performance criteria 122 may include, e.g., latency criteria; availability criteria; throughput criteria; scalability criteria; and consistency level criteria, which may be defined by consistency models such as strong consistency, bounded staleness consistency, session consistency, prefix consistency, and/or eventual consistency. Other types of performance criteria 122 may also be involved, such as a redundancy criterion 122 (e.g., a number of replicas over which new or updated data is replicated to preserve the data in case one or several servers 104 fail or lose data); a versioning criterion 122 (e.g., a number of version of data items 108 that are preserved to enable rollback in case of data corruption); a geographic disposition criterion 122 (e.g., a placement of servers 104 and/or designation of masters 116 that includes, excludes, or is limited to selected regions); and/or a security criterion (e.g., an isolation of data sets 106 and/or workloads 114 to ensure that servers 104 are isolated and dedicated for use for a data set 106, workload 114, and/or client 112). Some service level agreements may specify different performance criteria 122 for different portions of the data set 106 and/or workload 114 (e.g., different tasks comprising different portions of the data set 106 and/or different types of workloads 114, such as queries that have different performance sensitivities); for different types of clients 112 (e.g., workloads 114 executed by or on behalf of a first class of clients 112 may involve a first set of performance criteria 122, and workloads 114 executed by or on behalf of a second class of clients 112 may involve a different set of performance criteria 122); and/or for different contexts in which a data set 106 is utilized and/or a workload 114 is performed (e.g., different performance criteria for peak hours vs. off-hours). Many such variations may be included in variations of the techniques presented herein.

E2. Master Designation and Server Set Partitioning

Figure 7:
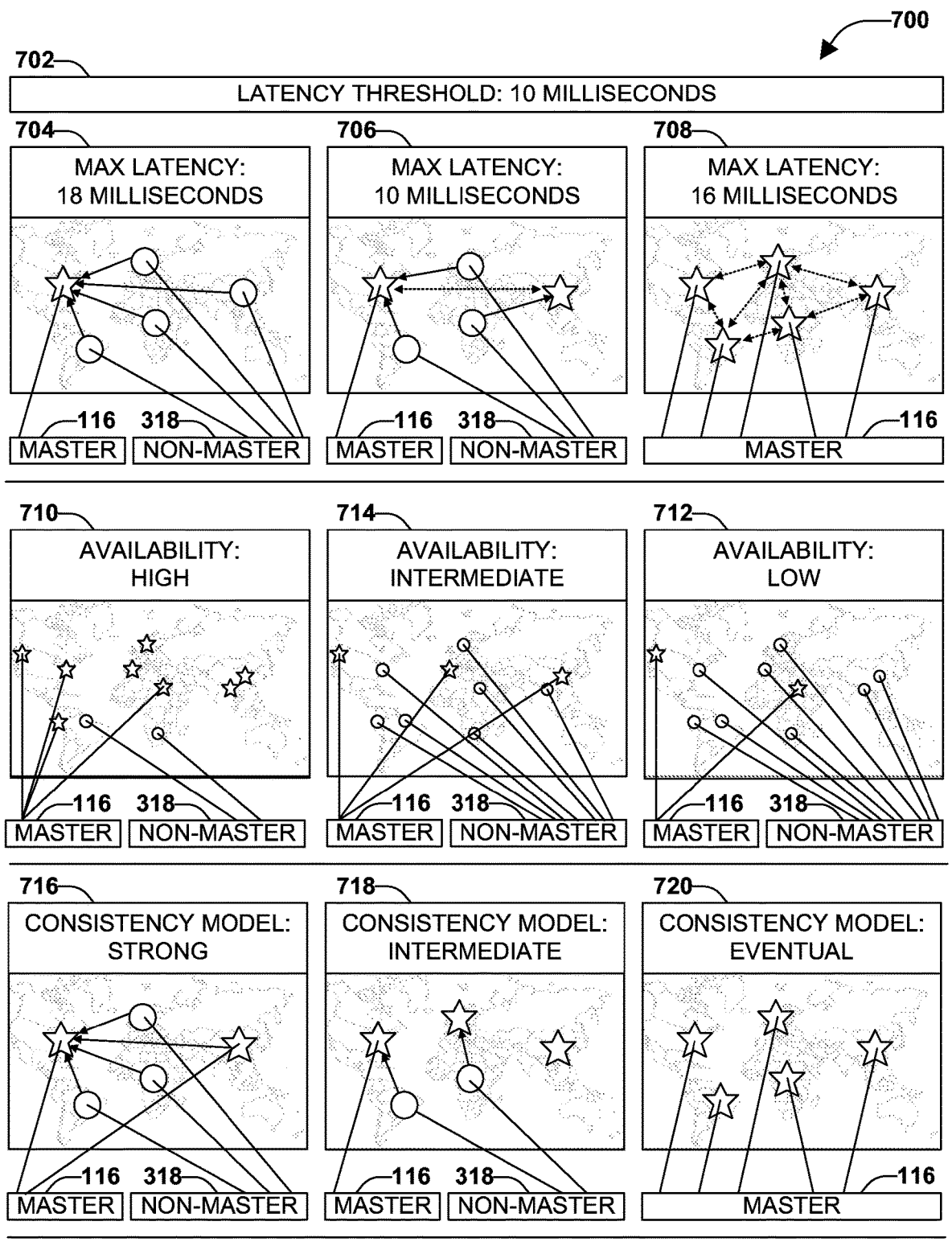
FIG. 7 is an illustration of a set of example scenarios featuring a selection of masters in accordance with the techniques presented herein.

A second aspect that may vary among embodiments of the techniques presented herein involves the designation of multiple masters 116 among the servers 104 that are permitted to update a data item 108 of the data set 106, and the partitioning of the server set 102 into a master subset of at least two masters 116 and a non-master subset of at least one non-master 318. Some of these variations are illustrated in FIG. 7.

As a first variation of this second aspect, the server set 102 may be partitioned to designate a master subset of at least two masters 116 that are permitted to update any data item 108 of the data set 106 and a non-master subset of at least one non-master 318 that is not permitted to update any data item 108 of the data set 106. Alternatively, the data set 106 may be partitioned into a first data subset and a second data subset, and the partitioning may involve partitioning the server set 102 into a first set of masters 116 and non-masters for the first data subset and a second, non-redundant set of masters 116 and non-masters 318 for the second data subset. The subsets of the data set 106 for which different partitions of the server set 102 are selected may involve, e.g., different regions over which the server set 102 and/or data set 106 is distributed; different types of data sets 106 and/or servers 104; and/or different workloads 114 and/or clients 112 for whom the data set 106 is provided.

As a second variation of this second aspect, partitioning the server set 102 may involve a designation of masters 116 on a regional basis; e.g., a server set 102 may be distributed over at least two geographic regions, and the partitioning may involve designating at least one server 104 in each region as a master 116 of at least some data items 108 of the data set 106. In some embodiments, such designation may be further performed based on determined and/or expected sources of requests 118 for updates 120 to the data set 106, and the partitioning may involve identifying a geographic location as a source of requests 118 to update the data set 106 and designating a server 104 of the server set 102 that is proximate to the geographic location as a master 116 of the data items 108 that are anticipated to be updated by clients 112 near the geographic location.

As a third variation of this second aspect, the partitioning of the server set 102 into masters 116 and non-masters 318 may be based upon the particular types of performance criteria 122 for the workload 114. That is, different types of performance criteria 122 may involve different heuristics and/or strategies for partitioning the multi-master server set 102 in a manner that promotes the consistent fulfillment of the performance criteria 122.

FIG. 7 is an illustration of a set of example scenarios 700 in which a server set 102 for a data set 106 is partitioned between a master subset of at least two masters 116 and a non-master subset of at least one non-master 318 based upon the particular performance criteria 122 involved in the workload 114.

A first example shown in FIG. 7 involves a performance criterion 122 comprising a latency threshold 702, e.g., a 10-millisecond maximum duration in which an update 120 is expected to propagate throughout the server set 102. A single-master partitioning 704 may be identified as involving a maximum latency of 18 milliseconds, due to the worst-case path by which a request 118 may be forwarded to the selected single master 116 (e.g., a selection of a single master 116 located in the United States may involve a lengthy transmission delay from clients 112 located in Asia). Conversely, an all-master partitioning 708, in which all servers 104 are identified as masters 116, may also involve a high maximum latency due to the extensive coordination involved in propagating the update 120 to every server 104 of the server set 102. A multi-master partitioning 706 may present a balancing point in which each non-master 318 is relatively proximate to a master 116 (thus reducing the forwarding delay in forwarding requests 118 for updates 120 from a non-master 318 to a master 116), and also limiting the number of masters 116 to which an update 120 has to be propagated to ensure further propagation to the entire server set 102 as well as verification of the absence of data version conflicts. The multi-master partitioning 706 may therefore provide a placement of servers 104 and/or partitioning between masters 116 and non-masters 318 that provides a worst-case latency that is within the latency threshold 702 comprising the performance criterion 122.

A second example shown in FIG. 7 involves a partitioning of the server set based on a performance criterion 122 specified as an availability of the workload 114 to the clients 112. A first partitioning 710 may be provided for a workload 114 that depends upon high availability, such as a service that has to remain available to receive and process updates 120 even in the event of multiple server failures, a wide-scale network partitioning, or a regional catastrophic event, such as a communication platform for first responders or government agencies. The partitioning may therefore involve a designation of a large number of masters 116, such that any client 112 that is able to connect to a network such as the Internet is guaranteed to find at least some masters 116 that are available to receive and process updates 120. However, the first partitioning 710 may exhibit high latency in confirming updates 120 across the entire server set 102 and/or may raise the likelihood of data version conflicts. On the other hand, a second partitioning 712 may be provided for a service that involves a performance criterion 122 only involving a low availability for processing updates 120, such as a relatively static distribution of content that may be widely available for reading but where temporary unavailability for updates 120 and a modest delay in propagating updates 120 may be tolerable. Such workloads 114 may be satisfied by allocating a server set 102 comprising a significant number of servers 104 but designating only a few masters 116, such that the majority of the servers 104 are non-masters 318 that provide read-only access to the data set 106. Such designation may reduce the administrative complexity and the resource allocation in view of the relaxed performance criteria 122 of the workload 114. A third partitioning 714 may be provided for a workload 114 specifying a performance criterion 122 of an intermediate availability, where the third partitioning 714 may involve a designation of a modest but not excessive number of masters 116 (e.g., one master 116 in each of several broad geographic regions, such as continents) to provide a balance between availability of the workload 114 to clients 112 in the event of localized networking or server failures and the resource costs of the partitioning of the server set 102.

A third example shown in FIG. 7 involves a partitioning of the server set based on a performance criterion 122 specified as a consistency model. A first workload 114 may present a performance criterion 122 involving a strong consistency model, such as a condition that a requested update 120 is to be committed over the entire server set 102 before being reported to a client 112 as a fulfillment of a request 118. Such strong consistency may be appropriate, e.g., for financial transactions that depend upon complete guarantees of reliability. The server set 102 in this case may involve a first partitioning 716 of the server set 102 that involves a strong level of consistency, wherein the first partitioning 716 comprises the designation of two masters 116, which may confer with one another to verify and guarantee the absence of data version conflicts involving an update 120 before reporting the fulfillment of the request 118 to the client 112, where the two-master configuration provides a measure of availability in case one of the masters 116 fails or becomes inaccessible. A second partitioning 718 may involve an intermediate level of consistency, such as session consistency in which each master 116 provides a view of the data set 106 that is consistent within a session provided to respective groups of clients 112, though the sessions may differ from one another. The second partitioning 718 may involve the selection of one master 116 for each such group of clients 112, wherein data version conflicts among updates 120 may result in acceptable differences in versions of a data item 108 as perceived by different sessions, and wherein the masters 116 may resolve such differences in a relaxed manner to maintain the session consistency of each master 116 and group of non-masters 318. A third partitioning 720 may involve an eventual consistency model, in which each server 104 may reflect a series of updates 120 that are temporarily inconsistent with respect to the entire data set 106, and wherein updates 120 are eventually received and reorganized by each server 104 to present a consistent view of the data set 106. A third partitioning 720 may be provided in which all servers 104 are designated as masters 116, and in which all servers may eventually propagate updates 120 throughout the data set 102 on an indeterminate but unconstrained basis. In this manner, variations in the types of performance criteria 122 may inform the designation of masters 116 and the partitioning of the server set 102 in accordance with the techniques presented herein.

As a fourth variation of this second aspect, a variety of techniques may be used to verify that the partitioning of the server set 102 into a master subset and a non-master subset is sufficient to fulfill the performance criteria 122 of the workload 114, such as may be specified in and/or guaranteed by a service level agreement. As a first such example, the capabilities of various partitions of the server set 102 may be prospectively evaluated through estimation, prediction, and/or heuristics (e.g., estimating the latency and/or throughput of respective servers 104 in a selected partitioning of the server set 102 and comparing the estimates with a latency threshold and/or estimated volume of the workload 114) and compared with a similarly evaluated computational demand in providing the workload 114 according to the performance criteria 122. Alternatively or additionally, a partitioned server set 102 may be subjected to a computational load, either of the workload 114 or of a simulation thereof, and the performance of the partitioned server set 102 may be measured and compared with the performance criteria to verify that the partitioned server set 102 fulfills the performance criteria 122 of the data set 106 and the workload 114. For example, a workload 114 may involve a performance criterion 122 comprising a latency threshold for propagation of updates 120 to the data set 106, and an embodiment may observe the performance of the server set 102 during the commitment of updates 120 to various data items 108 in order to verify that the updates 120 of the partitioned server set are completed within the latency threshold. In an embodiment, the evaluation may be performed for a task of the workload 114 by identifying a set of paths through the server set 102 by which the task is performed; among the set of paths, identify a worst-performing path (e.g., the longest network path, by distance and/or number of nodes, over which the server set 102 communicates regarding an update 120 of the data set 106) and verifying that the worst-performing path fulfills the performance criterion 122.

As a fifth variation of this second aspect, the designation of servers 104 as masters 116 and non-masters 318 and the partitioning of the server set 102 into a master subset and a non-master subset—as well as the redesignation and repartitioning, as further discussed herein—may be achieved in a variety of ways. As a first such example, the designation and partitioning may be performed by a user such as an administrator, either via direct selection of servers 104 and designation as masters 116 or non-masters 318, or via the provision of a logic, such as rules or conditions under which respective servers 104 are to be designated as masters 116 or non-masters 318. As a second such example, the designation and partitioning may be determined in an automated manner, e.g., via rules or heuristics (e.g., a rule that two servers 104 in each region are to be designated as masters 116, such as the two servers 104 that exhibit the lowest update latency and/or that are centrally located, that the rest of the servers 104 in the respective regions are to be designated as non-masters 318), or via simulation, such as generating a set of candidate partitions of the server set 102 and comparing simulated and/or measured performance metrics to identify a partition that may satisfy the performance criteria 122 of a service level agreement. Such comparison may be guided by heuristics, such as genetic selection of candidate partitions, or may be performed by sampling a substantial portion of the search space of the candidate partitions, optionally performing such testing to the exhaustion of the search space. Such searches may also be informed by prior instances of partitions of the server set 102 for the same or other data sets 106 and/or workloads 114. As a third such example, the partitioning may be performed in a centralized manner (e.g., a single user or process determines the partitioning) or a decentralized manner (e.g., respective servers 104 elect to serve as a master 116 or a non-master 318 of a data item 108, and conflicts such as too many or two masters 116 are resolved via vote-based consensus). As a fourth such example, the partitioning may be informed by and/or performed according to the details of the server set 102 (e.g., designating some servers 104 as non-masters that lack the computational resources to apply updates 120 in accordance with a performance criterion 122), the data set 106, the workload 114, and/or the client set 110 (e.g., examining the data set 106 and the usage by the workload 114 to identify a consistency level and a latency threshold according to the semantics of the workload 114 and/or the geographic distribution of the client set 110). As a fifth such example, designation and partitioning may be performed at various levels of granularity (e.g., the designation of a server 104 as a master 116 may apply to all data items 108 of the data set 106, or only to a select data item 108 or even a portion thereof; and the designation of the server 104 as a master 116 may apply to all data sets used by workloads 114 of a particular user or application, or even to all data sets used by workloads 114 of several or even all users or applications). Some embodiments may utilize a combination of such techniques; e.g., an administrator may specify a few heuristics, and an automated process may be applied to choose a partitioning that satisfies the performance criteria 122 in addition to the heuristics. Conversely, an automated process may be utilized to generate a small number of candidate partitions, optionally with varying tradeoffs (e.g., a first partition that presents lower latency but higher consistency than a second partition), and an administrator may be presented with the set of candidate partitions (optionally describing the relative advantages of each) and allow the administrator to choose the partitioning of the server set 102 for the data set 106 and workload 114. Many such variations may arise within the range of scenarios within which the currently presented techniques may be utilized.

E3. Forwarding Requests and Propagating Updates

A third aspect that may vary among embodiments of the techniques presented herein involves the forwarding 324 of requests 118 from non-masters 318 to masters 116 and the propagation 320 of updates 120 from masters 116 to other servers 104 of the server set 102. Some of these variations are illustrated in FIG. 8.

As a first variation of this third aspect, the partitioning of the server set 102 into a master subset of masters 116 and a non-master subset of non-masters 318 may also involve a designation of communication routes among the servers 104. As a first such example, the partitioning may include a designation of routes by which respective non-masters 318 of a data item 108 forward requests 118 for updates 120 of the data item 108 to masters. Respective servers 104 that are designated as a non-master 318 of the data item 108 may identify a selected master 116 of the master subset for forwarding such requests 118, and may store the selected master 116 in order to facilitate the routing of requests 118 that the non-master 318 is not permitted to fulfill. Later, when a request 118 to update 120 the data item 108 is received, the non-master 318 may retrieve the stored identification of the selected master 116 for the data item 108 and may forward the update 120 to the identified master 116. As a second such example, the partitioning may include a designation of routes by which respective masters 116 of a data item 108 propagate updates 120 of the data item 108 to other servers 104 of the server set 102. For example, a master 116 that updates a data item 108 of the data set 106 may first propagate the update 120 to the other masters 116 of the data item 108, e.g., in order to detect and address data version conflicts 202 involving mutually exclusive updates 120 to the data item 108 that one of the other masters 116 may have committed. In the absence of such data version conflicts 202, each master 116 may propagate the update 120 to a subset of non-masters 318, e.g., a regional subset of the server set 102. Other routes are also possible; e.g., a first master 116 may propagate the update 120 to a second master 116, which may in turn propagate the update 120 to a third master 116, etc. In some embodiments, the propagation may specifically include transmitting the update 120, or a notification thereof, to non-masters 318 (e.g., so that a non-master 318 serving clients 112 that are subscribed to updates 120 of the data item 108 may be promptly notified and may in turn promptly notify the subscribed clients 112). In other embodiments, the propagation may be limited to the masters 116 of the data item 108, each of which may apply the update 120 to a local copy of the data set 106, and non-masters 318 may receive the update 120 upon querying the data item 108 or examining a change feed of the data set 106.

Figure 8:
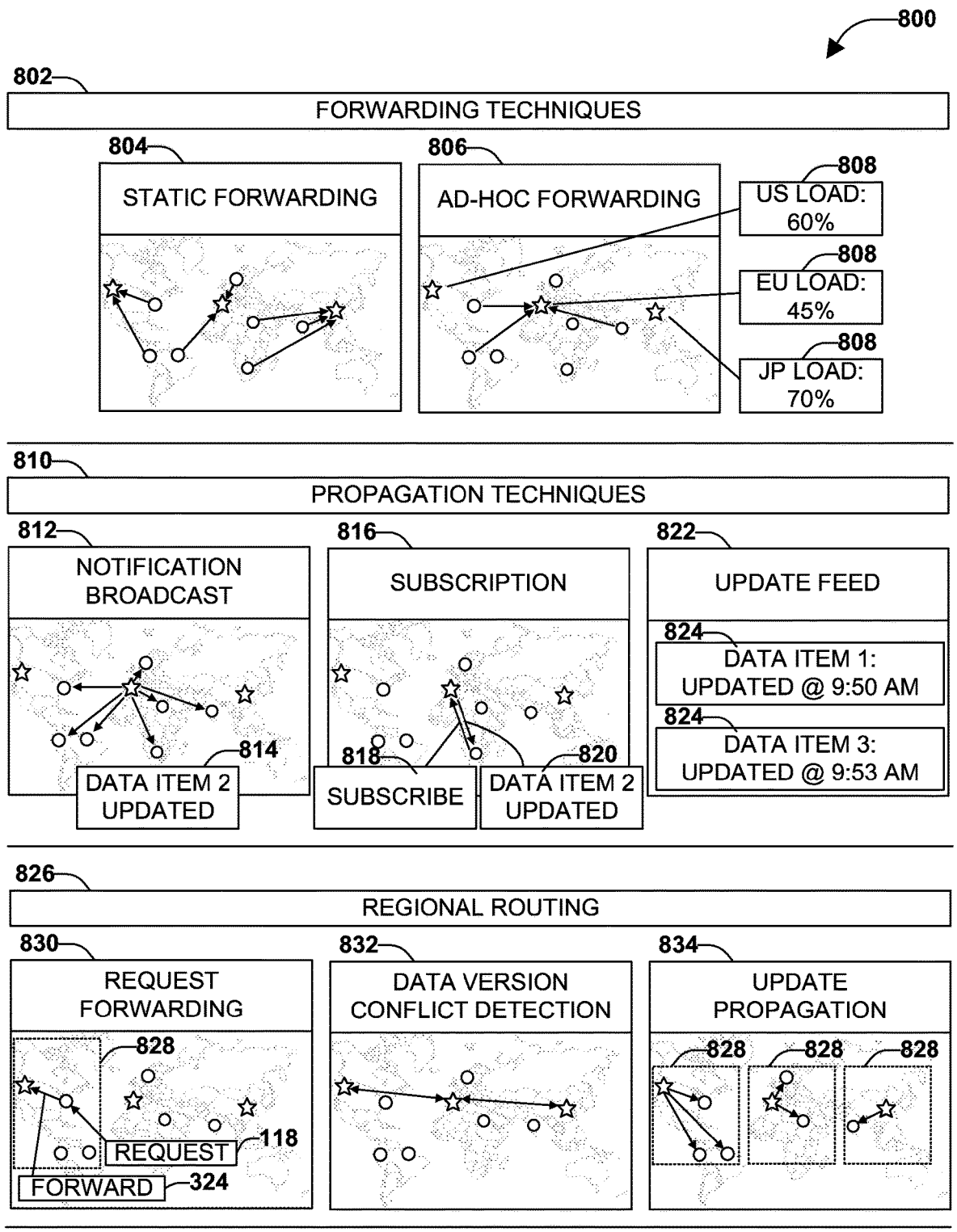
FIG. 8 is an illustration of a set of example scenarios featuring a dynamic selection of masters in accordance with the techniques presented herein.

FIG. 8 is an illustration of a set of example scenarios 800 featuring a variety of techniques for forwarding 324 requests 118 and propagating 320 updates 120 in accordance with the techniques presented herein. As a second variation of this third technique, forwarding techniques 802 may be utilized that involve static routing 804, wherein respective non-masters 318 store a designation of one or more selected masters 116, among a set of masters 116 for a particular data item 108, to whom requests 118 to update the data item 108 are forwarded. Alternatively, forwarding techniques 802 may be utilized that involve an ad-hoc selection of one of the master 318 for a data item 108 in order to forward a request 118 to update the data item 108. In one such ad-hoc forwarding technique 806, respective masters 116 for a data item 108 may report a current computational load 808, and non-masters 318 forward requests 118 to update the data item 108 to the master 116 with the lowest current computational load 808, thereby distributing the computational demands of applying updates 120 to the data item 108 in a load-balanced manner. An embodiment of the currently presented techniques may utilize a combination of such forwarding techniques 802, e.g., typically static forwarding with an ad-hoc fallback mechanism if the statically assigned master 116 exhibits a computational load 808 above a computational load threshold.

FIG. 8 also presents some examples of a third variation of this third aspect involving propagation techniques 810 for propagating updates 120 throughout the server set 102. A first propagation technique involves a notification broadcast 812, wherein a master 116 that applies an update 120 to a data item 108 generates a broadcast notification 814 that the data item 108 has changed. Such broadcast notifications 814 may include the entire server set 102 or a propagation subset thereof, such as other masters 116 of the updated data item 108 and/or non-masters 318 within a logical group. Respective servers 104 may choose to receive or broadcast notifications 814, e.g., through a local filter. Although presenting a comparatively inefficient mechanism, broadcast notifications 814 may be a suitable propagation technique 810 for data sets 106 that are small or that are not frequently updated, and/or where the server set 102 is fluid such that non-masters 318 that may be interested in updates 120 to the data set 106 may frequently join or depart. A second propagation technique involves a publication/subscription model 816, wherein selected servers 104 that are interested in and/or utilizing a particular data item 108 may subscribe 818 to receive notifications of updates 120 applied to the data item 108. A master 116 that applies an update 120 to the data item 108 may publish 820 a notification to the servers 104 that have subscribed 818 to receive such notifications. This variation may be more efficient than notification broadcasts 812, particularly for data sets 106 that are large and/or that change frequently, as well as scenarios in which the urgency of communicating updates 120 to a dynamic set of interested servers 104 is significant. A third propagation technique involves an update feed 822 stores a series of updates 824 to the data set 106, in the manner of a journal or log, and other servers 104 of the server set 102 may examine the update feed 822 to receive notifications of updates 120 to the data set 106. An update feed 822 may provide a more persistent record of updates 120 than may be achieved through typically transient network-based notifications, and may therefore be advantageous, e.g., in sporadically or occasionally connected scenarios in which servers 104 that initially connect or reconnect to the server set 102 review the update feed 822 to view the history and sequence of updates 120. Propagation techniques 810 may An embodiment of the currently presented techniques may utilize a combination of such propagation techniques 810, e.g., a subscription-based model with an update feed 822 that enables new subscribers of a data item 108 to review the history of updates 120 to the data item 108.

FIG. 8 also presents a fourth variation of this third aspect that involves a combined forwarding and propagation technique based on regional routing 826, wherein regional groups 828 are established that define geographic partitions of servers 104 of the server set 102, such as a first regional group 828 for servers 104 located in North America, South America, and Antarctica; a second regional group 828 for server 104 located in Europe and Africa; and a third regional group 828 for servers 104 located in Asia and Australia. For the respective data items 108 of the data set 106, each regional group 828 is partitioned into a master subset of at least one master 116 and a non-master subset of at least one non-master 318, wherein the multi-master configuration of the server set 102 is achieved through the coordination between the masters 116 across the regional groups 828. A non-master 318 that receives a request 118 to update the data item 108 may forward 830 the request 118 to the master 116 of the data item 108 within the regional group 828 that has been designated for the data item 108. The master 116 receiving the request 118 may update 120 the data item 108 and then communicate with the masters 116 of the other regional groups 828 to perform data version conflict detection 832 (e.g., determining whether the update 120 conflicts with another update 120 of the same data item 108 committed by another master 116, and either resolving the data version conflict 202 or verifying that no data version conflict 202 exists). Following completion of the data version conflict detection 832, the respective masters 116 may propagate 834 the update 120 to the non-masters 318 within the regional group 828. In this manner, regional groups 828 may be selected to organize both the forwarding 324 of requests 118 and the propagation 320 of updates 120.

As a fifth variation of this third aspect, the partitioning of the designation of servers 104 as masters 116 may also be used to promote the propagation of updates 120 throughout the server set 102 using a variety of transactional and consensus techniques. For example, respective masters 116 may be designated as a local transaction coordinator to update the data set 106 as a local consensus of the server subset, and the master 116 may be designated to coordinate with at least one other master 116 as a distributed transaction coordinator to propagate updates 120 as a distributed consensus of the server set 102. That is, an update 120 may be performed upon the data set 106 by initiating a localized transaction among each server subset by a master 116 designated for the server subset, and a second-level consensus may be performed among the masters 116 to establish the propagation of the update 120 throughout the server set 102. This technique may enable the completion of a nested consensus regarding an update 120 over a broad set of servers 104 and in a parallelized manner, which may promote the fulfillment of a latency performance criterion 122 such as a latency threshold for updates 120 to the data set 106. Many such forwarding and propagation techniques may be utilized in variations of the techniques presented herein.

E4. Dynamic Master Designation and Repartitioning

A fourth aspect that may vary among embodiments of the techniques presented herein involves a dynamic master designation, wherein the partitioning of the server set 102 into a master set of masters 116 and a non-master set of non-masters 318 varies over time. Some of these variations are illustrated in the example set 900 of FIG. 9.

As a first variation of this fourth aspect, the initial partitioning of the server set 102, for the respective data items 108, into a master subset and a non-master subset may comprise a dynamic partitioning that is defined as varying according to particular conditions. Respective servers 104 are designated as a master 116 of the data item 108 while a master condition is satisfied, and as a non-master 318 of the data item 108 while the master condition is not satisfied. The master conditions may be prescriptive, such as a periodic schedule (e.g., wherein a server 104 is designated as a master 116 for a particular data item 108 during a master period of a time cycle, and is designated as a non-master 318 for portions of the time cycle outside of the master period), or contingent, such as a reorganization of the server set 102 in the event of a scenario such as an overloading of the server set 102.

Figure 9:
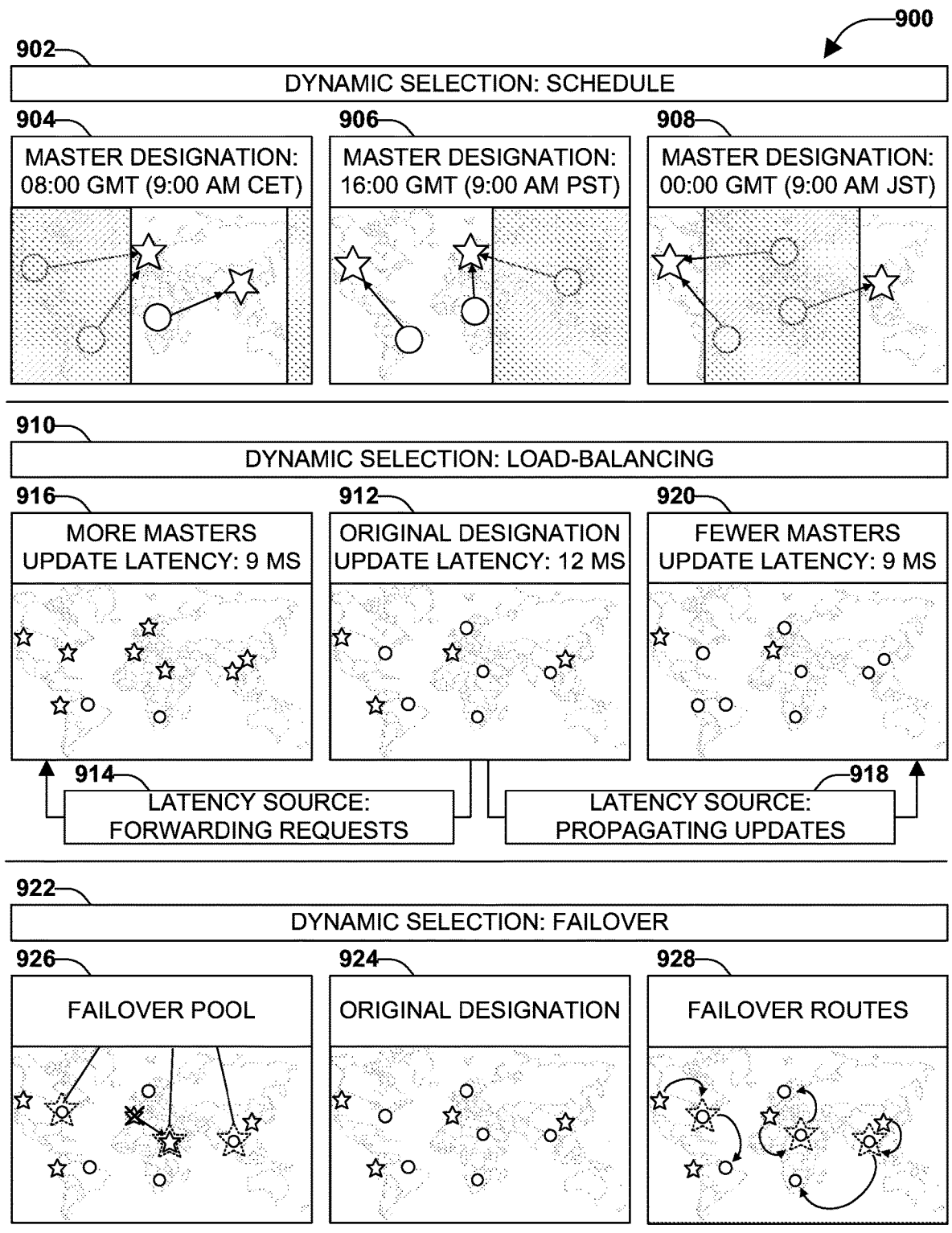
FIG. 9 is an illustration of a set of example scenarios featuring data version conflict resolution techniques for resolving data version conflicts in the data set in accordance with the techniques presented herein.

FIG. 9 presents an illustration of an example dynamic partitioning schedule 902 based on a circadian cycle. In this example dynamic partitioning schedule 902, the workload 114 involves updates 120 to a particular data item 108 of a data set 106 that occur primarily during business hours (e.g., 8:00 am through 6:00 pm), and performance criteria 122 such as low-latency updates are well-served by positioning one or more masters 116 of the data item 108 near the sources of updates. Since business hours occur at different times around the world in accordance with a circadian cycle, the designation of masters 116 also changes. At a first time 904 corresponding to 08:00 GMT, business hours occur for both western Europe (CET) and east Asia (JST), but not the west coast of North America (PST); accordingly, servers 104 in western Europe and east Asia are designated as masters 116 for the data item 108, and servers 104 elsewhere in the world are designated as non-masters 318 that forward updates to either western Europe or east Asia. At a second time 906 corresponding to 16:00 GMT, business hours are occurring on the west coast of North America, but not in east Asia; accordingly, the server set 102 is reconfigured to designate a master 116 of the data item 108 on the west coast of North America, while the master 116 in east Asia is redesignated as a non-master 318. At a third time 908 corresponding to 00:00 GMT, business hours have resumed in east Asia but have concluded in western Europe; accordingly, the western Europe master 116 is redesignated as a non-master 318 for the data item 108, and the east Asia server 104 is again promoted to the designation of master 116 for the data item 108. In this manner, the server set 102 may be repartitioned in accordance with a dynamic selection schedule 902 in accordance with the techniques presented herein.

As a second variation of this fourth aspect, the designation of masters 116 may change as the server set 102, the data set 106, and/or the workloads 114 changes. As a first such example, if a new server 104 is added to the server set 102, the new server 104 may be added to the partitioning of the server set 102 by designation as a master 116 of one or more data items 108 and/or a non-master 318 of one or more data items 108. Such designation may also involve redesignating other servers 104 (e.g., designating the new server 104 as a master 116 and redesignating a previous master 116 as a non-master 318, or designating the new server 104 as a non-master 318 and redesignating a previous non-master 318 as a master 116). Conversely, if a server 104 is removed from the server set 102, the remaining servers 104 may be redesignated (e.g., a removal of a master 116 of a particular data item 108 may cause a non-master 116 to be designated as a master 116 at least for the particular data item 108). As a second such example, the details and circumstances of the servers 104 may change, and may prompt a redesignation of such servers 104. For example, a first server 104 that has been designated as a master 116 for a data item 108 may experience a higher-than-expected computational load, which may jeopardize its ability to service the workload 114 in satisfaction of a performance criterion 122, and a second server 104 that has been designated as a non-master 318 may be redesignated as a master 116 of the data item 108, either substituting for or supplementing the master designation of the first server 104. As a third such example, the data set 106 may be expanded to include additional data items 108, and/or existing data items 108 may be divided, and servers 104 may be designated as masters 116 and non-masters 318 for the new data items 108. Conversely, the data set 106 may be reduced to remove and/or consolidate data items 108, and the former designation of servers 104 as masters 116 and non-masters 318 may be removed; optionally, a server 104 that was designated as a master 116 for a first data item 108 that is removed from the data set 106 may be redesignated as a master 116 for a second data item 108. As a fourth such example, the workload 114 involving the data set 106 may change, such as increasing or decreasing volume of requests 118, fluctuation in the client set 110, and/or increasing or decreasing complexity in the logical evaluation of the requests 118, and an initial partitioning of the server set 102 into masters 116 and non-masters 318 may be adjusted to accommodate the changes to the workload 114 and/or client set 110.

As a third variation of this fourth aspect, the server set 102 may be redesignated in response to a comparison of the performance of the server set 102 with a performance criterion 122, such as a latency threshold. An initial partitioning of the server set 102 into a master subset and a non-master subset for a particular data item 108 may be based on estimates and/or prior metrics of the achievable performance of the partitioned server set 102, such as the anticipated maximum latency arising over the worst-case path in applying an update 120 to the data item 108, wherein the estimates and/or prior metrics indicate that the partitioning is likely to be sufficient to satisfy the performance criteria 122. However, the actual performance of the server set 102 may vary from the estimates and/or prior metrics, e.g., due to inaccuracies in the estimates or variations in the logistics of the server set 102 between prior metrics and current metrics. In an embodiment, the server set 102 may be subjected to a performance metric, such as a measurement of latency of various updates 120 using simulations, test data, or production data. The performance of the server set 102 may be measured to determine that the performance metric of the server set jeopardizes the performance criterion 122 (e.g., that the maximum latency may, in at least some circumstances, exceed a latency threshold). In response to such detection, the server set 102 may be repartitioned in a manner that reduces the jeopardy of violating the performance criterion 122, such as by reducing the latency of the worst-case path.

FIG. 9 is an illustration of an example dynamic partitioning 910 of a server set 102 in order to balance the load, which particularly involves an evaluation of the current load in order to inform the selection of a more advantageous partition of the server set 102. In this example scenario, an initial partition 912 involves a regional designation of masters 116, possibly established by the use of a rule or heuristic. The data set 106 and/or workload 114 may be constrained by a performance criterion 122 including an update latency threshold of 10 milliseconds. It may be discovered that the original partitioning 912 exhibits an undesirably high update latency of 12 milliseconds, which exceeds the update latency threshold. In order to promote the fulfillment of the performance criterion 122, a repartitioning of the server set 102 may be undertaken; however, the nature of the latency may affect whether respective repartitionings exhibit lower update latency, the same update latency, or even higher update latency than the initial partition 912. For example, the update latency may be caused by a first update latency source 914 involving delays in the forwarding 324 of requests 118 from non-masters 318 to masters 116. These conditions may reflect long distances and/or poor bandwidth between non-masters 318 masters 116. Alternatively, update latency may reflect the computational load of masters 116 that are delayed in receiving and processing requests 118 for updates 120; even if the masters 116 are only moderately loaded and are exhibiting a typical processing delay, such typical processing delay may exacerbate a protracted propagation delay between the master 116 and a particularly remote client 112 or non-master 318. In this scenario, the latency may be addressed by a first repartitioning 916 that involves the addition of masters 116, e.g., by adding new servers 104 to the server set 102 for the data set 106 and data item 108 or by redesignating some non-masters 318 as masters 116. The first repartitioning 916 may address the first update latency source 914 of the update latency and may enable the update latency to satisfy the update latency threshold. Conversely, in a second scenario, a second update latency source 918 may involve the duration of propagating updates 120 among the masters 116 about an update 120, i.e., verifying the absence of data version conflicts 202 and/or resolving any data version conflicts 202 that may arise. These types of latency may reflect an excessive number of masters 116, which may make data version conflicts 202 more likely; increasing the complexity of resolving data version conflicts 202, such as the number of masters 116 with conflicting updates that have to be reversed; and/or involving an excessive intercommunication delay among a larger number of masters 116. In these scenarios, a second repartitioning 920 may be selected with fewer masters 116 (e.g., redesignating some masters 116 as non-masters 318 of the data item 108 and/or removing some masters 116 from the server set 102 for the data set 106). This second repartitioning 920 may consolidate updates 120 through a smaller number of masters 116, thereby reducing the incidence of data version conflicts 202, the complexity of resolving data version conflicts 202, and/or the communication delay among the masters 116 to propagate updates 120. It is to be appreciated that such analysis of the source of update latency may lead to divergent and even opposite types of repartitioning of the server set 102. In this manner, an analysis of the cause of update latency may inform the dynamic repartitioning of the server set 102 to promote the fulfillment of performance criteria 122 in accordance with the techniques presented herein.

As a fourth variation of this fourth aspect, a server set 102 may be repartitioned to accommodate failures of the server set 102, such as server hardware or software failures, data corruption, network outages, or emergency outages such as fire, flood, and electrical surges, and power failures. The server set 102 may respond to such events in a reactive manner; e.g., responsive to a failure, the server set 102 may be repartitioned to maintain the availability of the data set 106 the servicing of the workload 114, and the receipt and processing of requests 118 from clients 112. For example, when a selected server 104 that is designated as a master 116 for a particular data item 108 becomes inaccessible, the server set 102 may be repartitioned by adding a substitute server 104 and designating it as a master 116, and/or by identifying an existing server 104 that has been designated as a non-master 318 for the data item 108 and redesignating it as a master 116 for the data item 108.

As a fourth variation of this fourth aspect, in addition to partitioning the server set 102 into masters 116 and non-masters 318, the partitioning may include a designation of one or more servers 104 as an auxiliary master for a selected master 116 to address a computational overload of the selected master 116. The server 104 designated as an auxiliary master 116 may typically operate as a non-master 318 of the data item 108, e.g., by receiving requests 118 to update the data item 108 and forwarding 324 such requests 118 to the selected master 116 or another master 116 of the server set 102. However, when the selected master 116 becomes inaccessible or inadequate (e.g., while a computational load of the selected master 116 exceeds a computational load threshold), the auxiliary master may switch to operating as a master 116 of the data item 108, e.g., by responding to requests 118 to update the data item 108 by updating the data set 106 according to the request 118 and propagating 320 the update 120 to at least one other server 104 of the server set 102. In this manner, the auxiliary master 116 may supplement the update processing capabilities of the selected master 116 during periods of high computational load by directly handling some requests 118 to update 120 the data item 108. The offloading of at least a portion of the computational load of the selected master 116 may enable it to reduce its computational load to below the computational load threshold.

The designation of auxiliary masters 116 may vary in numerous respects. As a first such example, the designation as an auxiliary master may be performed, e.g., by the selected master 116 (e.g., each master 116 of the data set 106 for a data item 108 may identify and/or select a non-master 318 to serve as its auxiliary master 116 for the data item 108); by the non-master 318 (e.g., as a voluntary designation by the non-master 318); and/or by an administrator of the server set 102. In some scenarios, a pool of one or more non-masters 318 may be identified as members of an auxiliary master pool, such that excessive computational load exhibited by any master 116 may result in the selection of a member of the auxiliary master pool to serve as the auxiliary server for the selected master 116. As a second such example, the designation as an auxiliary master for the selected master 116 may occur proactively (e.g., as part of the initial partitioning of the server set 102, including the initial designation of the server 104 as a non-master 318 for the data item 108) and/or reactively (e.g., in response to the determination that the selected master 116 is subjected to an excessive computational load). As a third such example, a pool of one or more non-masters 318 may be identified as members of an auxiliary master pool, such that a computational overload any master 116 may result in the selection of a member of the auxiliary master pool to serve as an auxiliary server for the selected master 116. As a fourth such example, the same non-masters 318 are designated as auxiliary masters 116 for a selected master 116 for several data items 108 of the data set 106, optionally including all data items 108 of the data set 106, to assist with the processing of the computational load of the selected master 116. Alternatively, different non-masters 318 may be selected as auxiliary masters 116 for a selected master 116 for different data items 108, which may enable an excessive computational load of the selected master 116 to be distributed over the non-masters 318 of an auxiliary master pool. As a fourth such example, the selection of auxiliary masters 116 for different data items 108 for which a selected master 116 is so designated may occur simultaneously (e.g., when a computational threshold is exceeded by the selected master 116, auxiliary masters 116 may be activated for several or all data items 108 for which the selected master 116 is so designated). Alternatively, the designations may vary; e.g., a first auxiliary master 116 may be activated for a first data item 108 when the computational load of the selected master 116 exceeds a first computational threshold, and a first auxiliary master 116 may be activated for a second data item 108 when the computational load of the selected master 116 exceeds a second, greater computational threshold. As a fifth such example, when the computational load of the selected master 116 is restored to within the computational load threshold, the auxiliary master 116 may continue operating as an auxiliary master 116 (e.g., continuing to offload at least a portion of the computational load of the selected master 116, optionally for a brief duration to ensure that the computational load of the selected master 116 does not promptly exceed the computational load threshold again); or the auxiliary master 116 may be redesignated as a non-master 318, and may refrain from further applying updates 120 to the data item 108 in the data set 106; or the auxiliary master 116 may permanently substitute for the selected master 116, which may be redesignated as a non-master 318 for the data item 108.

As a fifth variation of this fourth aspect, in addition to partitioning the server set 102 into masters 116 and non-masters 318, the partitioning may include a designation of one or more servers 104 as a failover master for a selected master 116 to address a failure or inaccessibility of the master 116 (e.g., a hardware or software failure, data corruption, an electrical surge or power failure, or a network partitioning). When the selected master 116 is operational, the server 104 may operate as a non-master 318, e.g., by forwarding requests 118 to update the data item 108 to a master 116 of the data item 108, optionally the selected master 116. However, responsive to a failure of the selected master 116 that causes the selected master 116 to become inaccessible, the server 104 may transition to a designation as a failover master 116 for the data item 108, e.g., fulfilling requests 118 to update 120 the data item 108 by directly updating the data item 108 in the data set 106. In the event that the selected master 116 processed received requests 118 and applied updates 120 of the data item 108 to local copy of the data set 106 during the period in which the selected master 116 was inaccessible, the updates 120 to the data item 108 may be compared to determine and resolve the presence of data version conflicts 202 of the data item 108, or to verify the absence thereof.

The designation of failover masters 116 may vary in numerous respects. As a first such example, the designation as a failover master may be performed, e.g., by the selected master 116 (e.g., each master 116 of the data set 106 for a data item 108 may identify and/or select a non-master 318 to serve as its failover master 116 for the data item 108); by the non-master 318 (e.g., as a voluntary designation by the non-master 318); by a consensus of the server set 102 (e.g., the masters 116 of the server set 102 for a particular data item 108 may determine by consensus that the selected master 116 is unavailable, and may choose the non-master 318 as a failover master 116); and/or by an administrator of the server set 102. As a second such example, the designation as a failover master for the selected master 116 may occur proactively (e.g., as part of the initial partitioning of the server set 102, including the initial designation of the server 104 as a non-master 318 for the data item 108) and/or reactively (e.g., in response to the determination that the selected master 116 is inaccessible). As a third such example, a pool of one or more non-masters 318 may be identified as members of a failover master pool, such that the failure of any master 116 may result in the selection of a member of the failover master pool to serve as the failover server for the selected master 116. As a fourth such example, the same non-masters 318 are designated as failover masters 116 for a selected master 116 for several data items 108 of the data set 106, optionally including all data items 108 of the data set 106, which may enable a mass transfer of responsibility in the event of a failure of the selected master 116. Alternatively, different non-masters 318 may be selected as failover masters 116 for respective data items 108 for which the selected master 116 is designated as a master 116, which may result in a distribution of the computational load of the failed master 116 over a set of non-masters 318. As a fifth such example, when a selected master 116 that has failed becomes accessible again (e.g., due to a recovery or replacement of failed hardware or software, a correction of corrupted data, or a restoration of power and/or network connectivity), the failover master 116 may be redesignated as a non-master 318, and may refrain from further applying updates 120 to the data item 108 in the data set 106 in lieu of the selected master 318; or the failover master 116 may permanently substitute for the selected master 116, which may be redesignated as a non-master 318 for the data item 108.

FIG. 9 includes an illustration of an example dynamic partitioning 922 that includes two variations in the designation of failover masters 116. In this example scenario, an original designation 924 of the server set 102 involves a partitioning for a particular data item 108 of the data set 106, wherein the partitioning comprises a master subset of one or more masters 116 designated for each geographic region and a non-master subset comprising the remaining servers 104 in each region as non-masters 318.

FIG. 9 depicts a first example of this fifth variation of this fourth aspect, in which a failover master pool 926 is identified that comprises a subset of the non-masters 318 that are held in reserve to participate as failover masters 116 in the event of a failure of a master 116. When a selected master 116 fails, the failover master pool 926 may be examined to identify and choose a non-master 318 of the failover master pool 926 that is to server as the failover master 116 in place of the selected master 318. Such selection may involve, e.g., choosing the nearest non-master 318 that is not already serving as a failover master 116 for another master 116 that has previously failed (which may occur, e.g., with a particularly large server set 102 in which more than one master 116 may fail at any particular time, or in response to a large-scale event such as a regional power outage or network partition that causes at least two masters 116 to become concurrently inaccessible), and/or according to the computational load and/or network latency of the non-masters 318. The establishment of a failover master pool 926 may provide flexibility to choose non-masters 318 that substitute for masters 116 in the event of the failure of numerous masters 116, as well as a measure of redundancy that may support an availability guarantee (e.g., a statement that every master 116 in the server set 102 is backed by at least six non-masters 318 that may serve as failover masters 116).

FIG. 9 also depicts a second example of this fifth variation of this fourth aspect, in which the partitioning of the server set 102 into masters 116 and non-masters 318 includes failover routes 928, e.g., identified succession paths in which non-masters 318 are to serve as failover masters 116 in the event of a failure of a selected master 116. For example, the partitioning may identify a selected master 116 for the data item 108 in a particular region, as well as a first non-master 318 that serves as the first failover master 116 in case the selected master 116 is inaccessible, and a second non-master 318 that serves as the second failover master 116 in case both the selected master 116 and the first failover master 116 are inaccessible. The establishment of failover routes 928 may promote certainty in the transition of mastership from a failed selected master 116 to a non-master 318 serving as a failover master 116, which may promote rapidity in the substitution of servers 104 to address server failures or inaccessibility. Many such techniques may be utilized to repartition the server set 102 between masters 116 and non-masters 318 for a data item 108 in embodiments of the techniques presented herein.

E5. Data Version Conflict Detection and Resolution

A fifth aspect that may vary among embodiments of the presented techniques involves the detection and resolution of data version conflicts 202 due to the multi-master configuration of the server set 102, wherein mutually incompatible updates 120 of a data item 108 may be committed by different masters 116 of the data item 108 and may cause different servers 104 to perceive different versions of the data set 106.

As an example of such a data version conflict 202, the data item 108 may comprise a counter with an initial value of 10; the first update 120 may specify an increase in the value of the counter from 10 to 12; and the second update 120 may specify an increase in the value of the counter from 10 to 14. The final value of the counter may vary depending on how the updates 120 are received and processed by different masters 116. A first master 116 may receive and apply the first update 120 (making the value 12), and may then receive the second update 120 but may reject the second update 120 as inapplicable since the value of the counter is no longer 10. A second master 116 may receive and apply the second update 120 (making the value 14), and may then receive the first update 120 but may reject the first update 120 as inapplicable since the value of the counter is no longer 10. A third master 116 may concurrently receive both updates 120 (e.g., receiving one update 120 while the other update 120 is still pending, or even receiving both updates 120 simultaneously), may identify the potential for a data version conflict 202, and may reject both updates 120, leaving the data item 108 in its initial state with a value of 10. A fourth master 116 may receive and commit the first update 120, may then receive the second update 120 and identify the potential for a data version conflict 202, and may initiate a rollback of the first update 120—such that that the counter briefly exhibits the value 12, but then reverts to the value 10. A fifth master 116 may receive and commit the second update 120, may then receive the first update 120 and identify the potential for a data version conflict 202, and may initiate a rollback of the second update 120—such that that the counter briefly exhibits the value 14, but then reverts to the value 10. A sixth master 116 may receive both updates 120 and determine that the first update 120 requests a value increase of two, and the second update 120 requests a value increase of four, and, by applying the first update 120 and then the second update 120, such that the value of the data item 108 is briefly 12 and then ends at 16. A seventh master 116 may follow a similar process, but may receive and apply the updates 120 in the opposite order—such that the value of the data item 108 is briefly 14 and then ends at 16. In this manner, the processing of two updates 120 of a single, relatively simple data item 108 may result in a variety of data versions that reflect differences in the processing performed by each master 116 in a multi-master configuration. The details may become even more complicated, e.g., if more than two updates 120 and/or more than two master 116 are involved, resulting in more than two data versions; if an update 120 involves several data items 108, such as a transfer of value from a first data item 108 to a second data item 108, and moreover wherein the respective data items 108 may have different sets of masters 116; and/or if the complexity of the data item 108 is substantial.

As noted, the configuration of a server set 102 with multiple masters 116 may introduce or increase the prospects of data version conflicts 202 involving conflicting updates 120 by different masters 116. A variety of techniques may be utilized to detect and resolve such data version conflicts.

As a first variation of this fifth aspect, the detection of a data version conflict 202 may occur in many ways. As a first such example, a first master 116 that endeavors to apply an update 120 to a data item 108 may find that a previously applied and/or concurrently pending update 120 by a second master 116 produces a different version of the data item 108, such that applying the update 120 by the master 116 may leave the data item 108 in an inconsistent state. As a second such example, a first master 116 may apply a first update 120 to the data item 108, and may subsequently receive a second update 120 of the data item 108 propagated by a second master 116 that conflicts with the first update 120. As a third such example, respective masters 116 may apply updates 120 to local copies of the data set 106, and a synchronization process that endeavors to synchronize the local copies of the data set 106 (e.g., on a periodic basis) may identify a data version conflict 202 involving different versions of the data item 108 in different local copies of the data set 106. As a fourth such example, a process may scan the data set 106 and may discover the presence of data version conflicts 202 therein; e.g., the data version conflicts may involve a violation of a constraint of the data set 106, such as a violation of a schema of the data set 106 or a broken relationship, such as where a first master 116 creates a relationship of a first record to a second record while a second master 116 deletes the second record.

As a second variation of this fifth aspect, the resolution of the data version conflict 202 may take many forms. As a first such example, a resolution of a data version conflict 202 may comprise, e.g., a selection of one or more of the updates 120 that together provide a canonical state of the data item 108, wherein at least one non-selected update 120 is to be discarded and/or rolled back from the data set 106. As a second such example, where the data version conflict 202 involves a discrepancy among the masters 116 as to a sequential order in which various updates 120 are to be applied to the data item 108, the data version conflict resolution outcome may comprise, e.g., a canonical ordering in which the updates 120 are to be applied to the data item 108. As a third such example, the data version conflict resolution may involve a provision of a new update 120 to the data item 108 that represents the canonical state of the data item 108 after taking into account the conflicting updates 120. In some cases, the new update 120 may not be selected from any of the updates 120, but may rather be a superseding update 120 generated by the conflict resolution technique.

As a third variation of this fifth aspect, conflict resolution may be performed using a selected conflict resolution technique for any data item 108 of the data set 106. Alternatively, the server set 102 may comprise a conflict resolution technique set comprising a set of conflict resolution techniques that, respectively, evaluate a data version conflict 202 between two or more conflicting updates 120 of a data item 108 to identify a data version conflict resolution outcome; and the respective data items 108 of the data set 106 may indicate the selected data version conflict resolution technique to be invoked when data version conflicts 202 involving the selected data item 108 arise. This variation may enable data version conflicts 202 involving different portions of the data set 106 to be resolved using different data version conflict resolution techniques, which may be suitable for many data sets 106 that involve data items 108 of different types, semantic uses, and/or rules for resolving data version conflicts 202. When a data version conflict 202 is detected, the data version conflict resolution technique that is associated with at least one of the data items 108 involved in the data version conflict 202 may be selected and invoked to resolve the data version conflict 202.

In some variations, different portion of the data set 106 may be associated, e.g. in a static manner, with a particular data conflict resolution technique. For instance, certain sections, tables, paths, and/or data element types of the data set 106 may be associated with a first data version conflict resolution technique, while other sections, tables, paths, and/or data element types of the data set of a workload may be associated with a different data version conflict resolution technique. Alternatively or additionally, a portion of the data set 106 may be associated with multiple data version conflict resolution techniques, which may be selected in combination (e.g., to identify a consensus in the data version conflict resolution among the various data version conflict resolution techniques) and/or in a priority order (e.g., invoking a first data version conflict resolution technique, and either applying it if the first data version conflict resolution technique produces a high-confidence output, or invoking a second data version conflict resolution technique if the first data version conflict resolution technique produces a low-confidence output). In some embodiments, the particular data version conflict resolution technique to be applied to a portion of the data set 106 may be specified by a client 112. In some embodiments, the particular data version conflict resolution technique to be applied to a portion of the data set 106 may be determined on an ad-hoc basis (e.g., an API may be called with the details of the data version conflict 202, and may therefore choose a data version conflict resolution technique to resolve the data version conflict 202). In some embodiments, the particular data version conflict resolution technique to be applied to a portion of the data set 106 may be inferred, e.g., based on the context in which the data version conflict 202 arises, such as the type of conflict and/or the type of data item 108 involved in the conflict.

Figure 10:
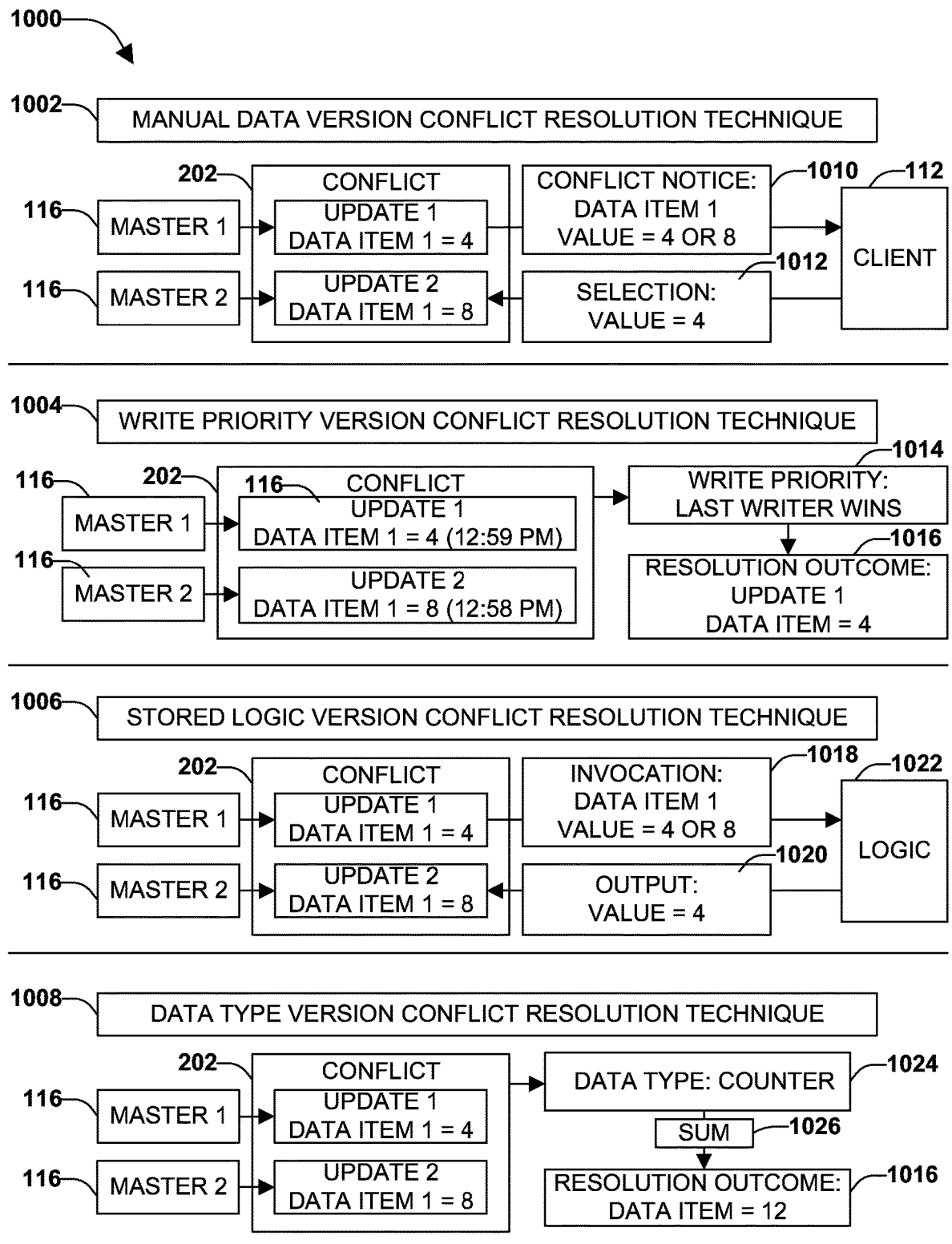
FIG. 10 is an illustration of an example set of scenarios featuring the forwarding of requests and propagation of updates among masters and non-masters in accordance with the techniques presented herein.

FIG. 10 is an illustration of an example set 1000 of examples demonstrating a few data version conflict resolution techniques.

FIG. 10 presents, as a first such example, a resolution of a data version conflict 202 using a manual conflict resolution technique 1002. When a data version conflict arises within a portion of the data set 106, a server 104 may register the data version conflict 202 (e.g., in a data version conflict log) and/or notify a client 112, such as a user or process that manages the data set 106 and/or the workload, as a request to resolve the data version conflict. In some embodiments, the server 104 may send a data version conflict notice 1010 to the client 112 that asks the client 112 to resolve the conflict, e.g., by deleting one of the conflicting data versions and/or selecting one of the data versions as the controlling data version. In some embodiments, the server 104 may assist the client 112 in resolving the data version conflict 202, e.g., by identifying and describing the data version conflict 202 and/or by presenting selectable options to the client 112 to resolve the conflict, optionally including details about the consequences of selecting each such option (such as presenting a view of the data set if each option is selected). In some embodiments, the server 104 may provide additional resources to enable the client 112 to resolve the conflict, e.g., executing code provided by the client to evaluate and/or resolve the data version conflict 202. The selection 1012 that the client 112 provides in response to the data version conflict 202 (e.g., the selected value that is to be applied in lieu of one, several, or all of the conflicting data versions) may be applied by the master 116 to the data item 108 in the data set 106 to resolve the data version conflict 202.

FIG. 10 presents, as a second such example, a resolution of a data version conflict 202 using a write priority data version conflict resolution technique 1004, such as a last-writer-wins policy. For example, a particular workload may be significantly based on a latest version of the data set 106, with little or no interest in maintaining past versions of the data set 106, such that data version conflicts 202 may be resolved by automatically choosing the latest update and overwriting previous versions of the data item 108, including earlier writes presented by data version conflicts 202. In such embodiments, the master 116 may automatically resolve data version conflicts by identifying and choosing the latest write. "Latest" may be determined in a variety of ways; e.g., if the distributed servers share a synchronized clock, respective updates 120 may be compared by timestamp, but if the distributed servers to not share a synchronized clock, the updates 120 may be compared by logical sequence numbers. In some variations, the latest update 120 may be selected while conflicting updates 120 are simply discarded; in other variations, the conflicting updates 120 may not be applied to the data set 106, but may be recorded in a log, used to update a logical sequence number of the updates, etc. Other variations that involve a relatively simple comparison and selection include: first-writer-wins (e.g., subsequent conflicting writes are discarded and may be reinitiated based on the updated data set); prioritization (e.g., updates 120 received and/or applied by a first master 116, or initiated by a first client 112, or of a certain value, may take write priority 1014 over updates 120 received and/or applied by a different master 116, initiated by a different client 112, or of a different value); and/or side-effects (e.g., updates 120 that require little or no rollback of other updates 120 may be selected over writes that require extensive rollback of other updates 120). In some instances, data version conflicts 202 may be selected arbitrarily (e.g., based on random number selection) and/or consensus (e.g., different masters 116 may vote on which of the conflicting data versions to accept). In some cases, multiple conflicting updates 120 may all be applied to resolve the data version conflict 202 (e.g., a first update that involves incrementing a data element and a second update that involves decrementing a data element may both be applied without conflict to the data element, and/or may be identified as canceling each other and therefore both dropped). A master 116 may receive from the write priority data version conflict resolution technique 1004 the one or more updates 120 provided as the data version conflict resolution outcome 1016 and apply such updates to resolve the data version conflict 202.

FIG. 10 presents, as a third such example, a resolution of a data version conflict 202 using a stored logic data version conflict resolution technique 1006. A client 112 may specify that a particular logic 1022 is to be used to evaluate and/or resolve any data version conflicts 202 that arise within a particular portion of the data set 106. The logic 1022 may be stored, e.g. as a stored procedure that is triggered whenever a data item 108 of the data set 106 is updated and/or whenever a data version conflict 202 is identified. When a master 116 identifies a data version conflict 202 involving multiple data versions of a data item 108 applied by different masters 116, the master 116 may retrieve and invoke 1018 the logic 1022 with the collection of conflicting data versions of the data item 108; the logic 1022 may provide output 1020 comprising a selection of one or more data version of the data item 108 to accept; and the master 116 may apply the selected data version and discard the conflicting data versions. In some circumstances, the logic 1022 may be stateful (e.g., recording the incidence of data version conflicts, and/or resolving a current data version conflict in view of past data version conflicts) and/or may generate reports for the client 112 of the workload. In some embodiments, the stored logic data version conflict resolution technique 1006 may be limited to an examination of the conflicting data versions (e.g., in order to expedite resolution of the data version conflict 202). In other embodiments, the stored logic data version conflict resolution technique 1006 may be permitted to inspect other aspects of the data set 106 in the context of evaluating and resolving the data version conflict (e.g., determining the consequences of choosing each data version on the overall integrity of the data set 106 of the workload). In some embodiments, a master 116 may invoke the logic 1022 within a snapshot isolation (e.g., the logic 1022 may be presented with a view of the data set 106 at the time the data version conflict 202 arose and/or was detected); in other embodiments, a master 116 may apply the logic 1022 to a live, dynamic version of the data set 106 (e.g., the stored logic data version conflict resolution technique 1006 may be presented with a current view of the data set 106). In some embodiments, the logic 1022 may be invoked on an ad-hoc basis, e.g., to evaluate and resolve an identified and currently pending data version conflict 202. Alternatively or additionally, the logic 1022 may be invoked on a prospective and/or proactive basis (e.g., a logic 1022 that scans the data set 106 of a workload to identify as-yet-undetected data version conflicts 202, and/or that examines pending transactions or activities to identify emerging instances of data version conflicts).

FIG. 10 presents, as a fourth such example, a resolution of a data version conflict 202 involving a conflict resolution data type (CRDT) technique 1008. A conflict resolution data type schema and/or specification may be provided that indicates the semantics of data version conflict resolution for any and all data items 108 of respective conflict resolution data types. For example, a data item 108 may be identified as an array. Data version conflicts may take the form of concurrent requests to add an item to the array while it is in a particular state (e.g., both a first master 116 and a second master 116 may agree that the array currently has three elements, but both masters 116 may initiate requests to submit different items as the fourth element in the array). The conflict resolution data type schema may be consulted to determine that such data version conflicts 202, in the context of an array, may be resolved by appending both items into the array, and optionally a selected appending order. As a second example, a data item 108 element may be identified as a value that is modified in a relative manner. For example, a counter-type integer with an initial value of 10 may be the subject of conflicting updates 120 of a data item 108: a first update 120 that indicates a value of 12 and a second update 120 that indicates a value of 15. The conflicting updates 120 may be interpreted as requests to increment the value by 2 and 5, respectively, and both updates may be applied by incrementing the value by 7 and writing the new value of 17. Alternatively, a value-type integer with an initial value of 10 may be the subject of conflicting updates 120: a first update 120 that requests a value of 12 and a second update 120 that requests a value of 15. In this case, the updates 120 may be identified as mutually exclusive—i.e., the data item 108 may comprise a reference to an identifier of another data item 108, and can only comprise either the value 12 (referencing a second data element) or value 15 (referencing a third data element), but not any other value. A selection may be made, or at least a pending data conflict may be registered. In some scenarios, clients 112 may be permitted to define one or more conflict resolution data types (CRDTs) and/or the semantics of updating such data types and resolving data version conflicts 202 thereof. In some scenarios, the conflict resolution data types of various data items 108 may be specified by a client 112, such as metadata annotations of the data elements according to the data types specified in the CRDT schema (e.g., "this integer is a counter" vs. "this integer is a reference"). Alternatively or additionally, the conflict resolution data types of respective data items 108 may be inferred, e.g., from the data item 108 (such as its name); from the access and/or usage patterns of the data item 108; and/or from similarities with other data items 108 for which conflict resolution data types have previously been identified. In some scenarios, the CRDT may be formalized as an application programming interface (API) that accepts a data version conflict 202 and other factors, such as the circumstances in which the data version conflict 202 arose, and that determines and applies an appropriate conflict resolution data type for the involved data item 108. In some embodiments (particularly inferences), the selected conflict resolution data type and associated resolution technique may be automatically applied (e.g., where the confidence in the inference is high) either permanently or tentatively; and/or the selected conflict resolution type and associated resolution technique may merely be identified and presented as a suggestion, e.g., to a client, a workload, and/or a conflict resolution delegate process.

As a fourth variation of this fifth aspect, a server set 102 may permit further access to the data item 108 while a data version conflict 202 involving the data item 108 is pending (e.g., responding to read requests by indicating the existence of the pending data version conflict and/or specifying the content of different data versions, and/or by selecting a default or tentative data version conflict that is to be tentatively considered the current state of the data element until the data version conflict is resolved). In other embodiments, the server set 102 may restrict access to the data item 108 while the data version conflict 202 is pending (e.g., quarantining the data item 108 from updates 120 and optionally even requests 118 to read the data item 108 until the data version conflict 202 has been resolved).

As a fifth variation of this fifth aspect, the selection and invocation of a data version conflict resolution technique to resolve a data version conflict 202 may be performed by any master 116 of the server set 102. Such variations may be significant, e.g., to reduce or avoid scenarios in which two or more masters 116 of a data item 108 detect the incidence of a data version conflict 202 and concurrently initiate data version conflict resolution techniques. For instance, each master 116 may concurrently apply an update 120 to the data item 108, and each master 116 may forward its update 120 to the other master 116. Responsive to receiving the update 120 from the other master 116, each master 116 may identify a data version conflict 202 involving the mutual exclusivity of the receive update 120 and its own update 120. Accordingly, each master 116 may, concurrently with the other master 116, invoke a data version conflict resolution technique to resolve the data version conflict 202. In some cases, such concurrent invocation may lead to identical or equivalent results by both masters 116, thus presenting an inefficiency and a duplication of effort. In other cases, such concurrent invocation may lead to a different data version conflict resolution by each master 116, thus resulting in a potential exacerbation of the data version conflict 202 and further divergence of the data set 106, particularly as each master 116 may operate as if the data version conflict 202 has been detected and resolved.

In some embodiments, a master 116 that detects the data version conflict 202 may automatically select and invoke the data version conflict resolution technique, and may apply an update 120 generated thereby to resolve the data version conflict 202, as well as propagate the update 120 to other servers 104 of the server set 102. Alternatively, it may be advantageous to choose a particular master 116 to select and invoke the data version conflict resolution technique for a particular data version conflict 202. In some embodiments, the server set 102 may include a master 318 that is further identified as a data version conflict resolution master 318 for at least a portion of the data set 106. A server 104 that identifies a data version conflict 202 and/or that is designated as a master 116 for a data item 108 involved in a data version conflict 202 may further determine whether or not it has been designated as the data version conflict resolution master for this data version conflict 202. If so, it may select, from a conflict resolution technique set, a conflict resolution technique that evaluates the updates 120 comprising the data version conflict 202; may invoke the conflict resolution technique set to generate a data version conflict resolution outcome 1016; may apply the data version conflict resolution outcome 1016 to the data set 106; and/or may propagate the data version conflict resolution outcome 1016 to other masters 116 of the data set 106. Alternatively, if the server 104 determines that a second server 104 of the server set 102 has been designated as the data version conflict resolution master for this data version conflict 202, the server 104 may notify the second server 104 of the data version conflict 202 and may await resolution by the second server 104.

Figure 11:
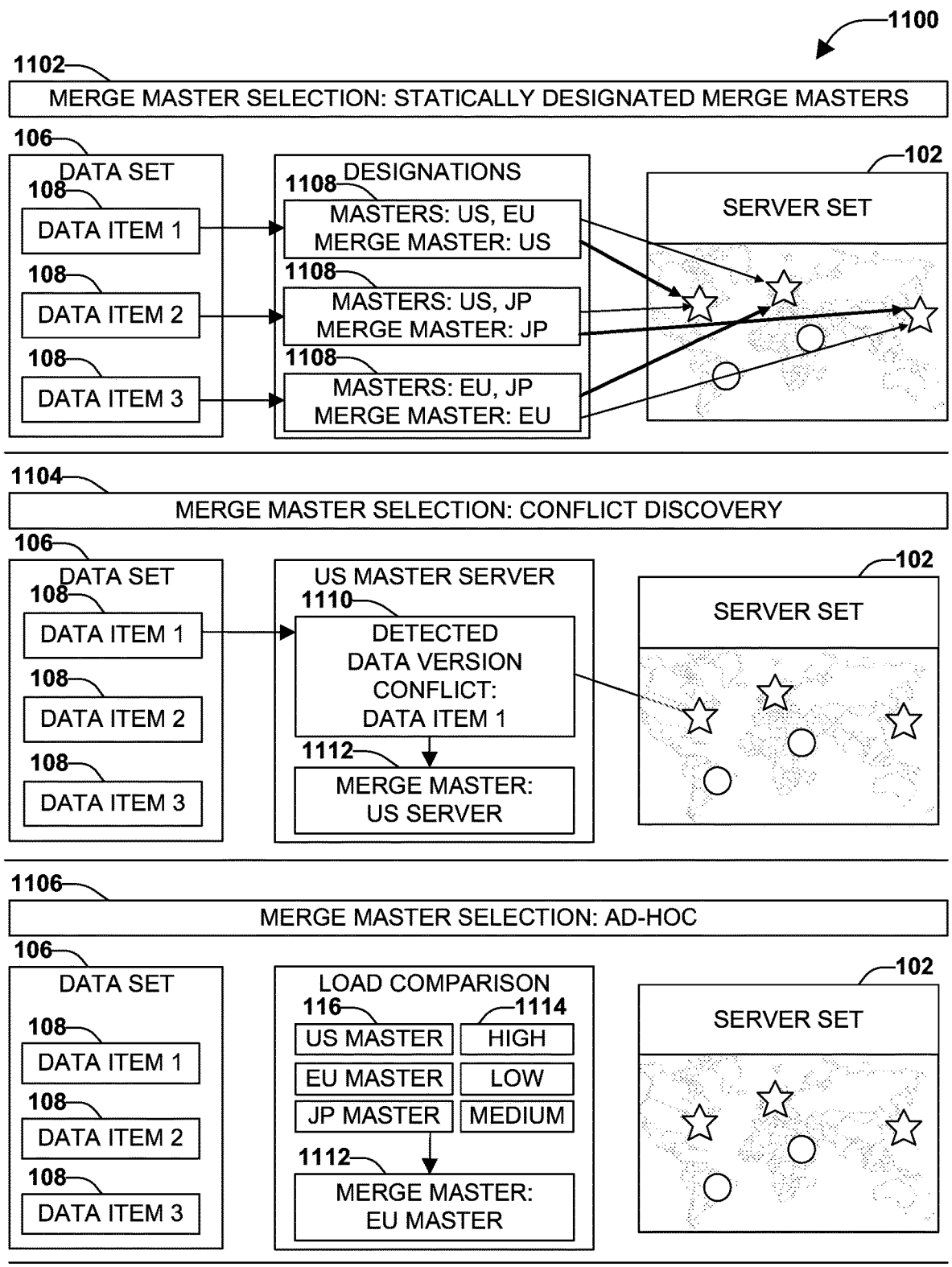
FIG. 11 is an illustration of a set of example scenarios featuring a selection of merge masters to resolve a data version conflict in accordance with the techniques presented herein.

FIG. 11 is an illustration of some example scenarios 1100 featuring a designation of a data version conflict resolution master 1112 to resolve a data version conflict 202. FIG. 11 presents, as a first such example 1102, a designation 1108 of a data version conflict resolution master 1112 in a static master; e.g., respective data items 108 of the data set 106 may have designations 1108 of both the masters 116 of the data item 108 and the data version conflict resolution master 1112 for the data item 108. When a server 104 identifies a data version conflict 202 involving a particular data item 108, the server 104 may identify the data version conflict resolution master 1112 that has been designated for the data item 108 and may notify the data version conflict resolution master 1112 of the data version conflict 202.

FIG. 11 presents, as a second such example 1104, a designation 1108 of a data version conflict resolution master 1112 in a dynamic manner. In this second example 1104, among the masters 116 in each of several geographic regions, a data version conflict resolution master 1112 is identified for each such region. In response to a detection 1110 of a data version conflict 202, a designation 1108 of a data version conflict resolution master 1112 for the data version conflict 202 may be performed, e.g., by identifying the master 116 that has been designated as a data version conflict resolution master 1112 for the geographic region in which the data version conflict 202 is initially detected. The data version conflict 202 may be forwarded to the data version conflict resolution master 1112 for the region for resolution.

FIG. 11 presents, as a third such example, 1106, an ad-hoc designation 1108 of a data version conflict resolution master 1112. In this third example 1106, at the time of a data version conflict 202, different masters 116 that may serve as a data version conflict resolution master 1112 may be subjected to an evaluation of a current computational load 1114. The master 116 currently exhibiting the lowest computational load 1114 among such masters 116 may be designated as the data version conflict resolution master 1112 for the data version conflict 202. Many such data version conflict resolution techniques may be selected and applied to various portions of the data set of a workload in accordance with the techniques presented herein.

F. Example Computing Environment

Figure 12:
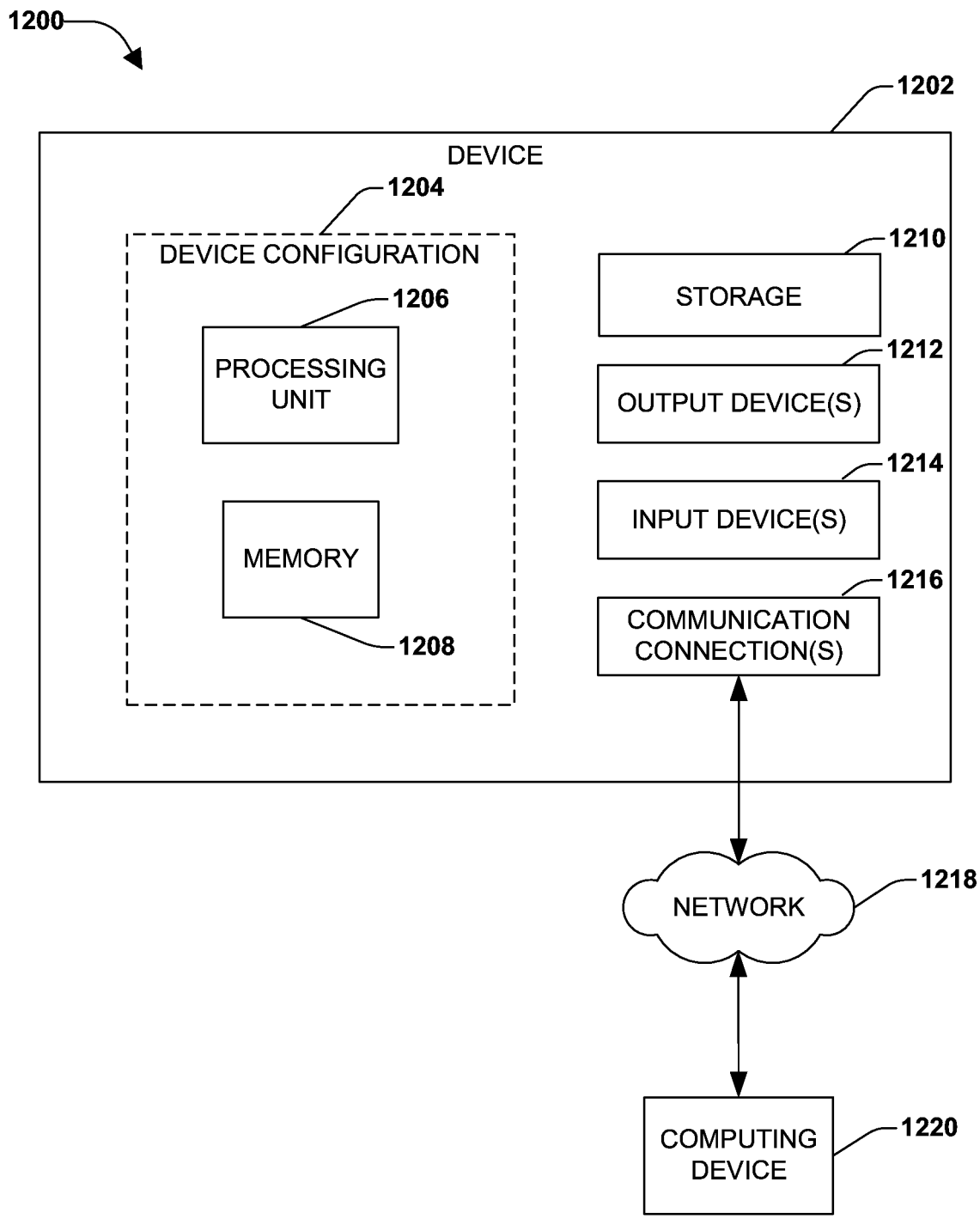
FIG. 12 is an illustration of an example computing environment within which one or more embodiments of the techniques presented herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example scenario 1200 featuring a system comprising a computing device 1202 configured to implement one or more embodiments provided herein. In one configuration, computing device 1202 includes at least one processing unit 1206 and memory 1208. Depending on the exact configuration and type of computing device, memory 1208 may be volatile (such as RAM, for example), nonvolatile (such as ROM, flash memory, etc., for example) or some combination of the two. This configuration is illustrated in FIG. 4 by dashed line 1204.

In other embodiments, device 1202 may include additional features and/or functionality. For example, device 1202 may also include additional storage (e.g., removable and/or non-removable) including, but not limited to, magnetic storage, optical storage, and the like. Such additional storage is illustrated in FIG. 4 by storage 1210. In one embodiment, computer readable instructions to implement one or more embodiments provided herein may be in storage 1210. Storage 1210 may also store other computer readable instructions to implement an operating system, an application program, and the like. Computer readable instructions may be loaded in memory 1208 for execution by processing unit 1206, for example.

The term "computer readable media" as used herein includes computer storage media. Computer storage media includes volatile and nonvolatile, removable and non-removable media implemented in any method or technology for storage of information such as computer readable instructions or other data. Memory 1208 and storage 1210 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1202. Any such computer storage media may be part of device 1202.

Device 1202 may also include communication connection(s) 1216 that allows device 1202 to communicate with other devices. Communication connection(s) 1216 may include, but is not limited to, a modem, a Network Interface Card (NIC), an integrated network interface, a radio frequency transmitter/receiver, an infrared port, a USB connection, or other interfaces for connecting computing device 1202 to other computing devices. Communication connection(s) 1216 may include a wired connection or a wireless connection. Communication connection(s) 1216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1202 may include input device(s) 1214 such as keyboard, mouse, pen, voice input device, touch input device, infrared cameras, video input devices, and/or any other input device. Output device(s) 1212 such as one or more displays, speakers, printers, and/or any other output device may also be included in device 1202. Input device(s) 1214 and output device(s) 1212 may be connected to device 1202 via a wired connection, wireless connection, or any combination thereof. In one embodiment, an input device or an output device from another computing device may be used as input device(s) 1214 or output device(s) 1212 for computing device 1202.

Components of computing device 1202 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1202 may be interconnected by a network. For example, memory 1208 may be comprised of multiple physical memory units located in different physical locations interconnected by a network.

Those skilled in the art will realize that storage devices utilized to store computer readable instructions may be distributed across a network. For example, a computing device 1220 accessible via network 1218 may store computer readable instructions to implement one or more embodiments provided herein. Computing device 1202 may access computing device 1220 and download a part or all of the computer readable instructions for execution. Alternatively, computing device 1202 may download pieces of the computer readable instructions, as needed, or some instructions may be executed at computing device 1202 and some at computing device 1220.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of configuring a server set to process a workload of a data set according to a performance criterion, the method comprising:
    for a first subset of data items of the data set, partitioning the server set into:
        a first master subset of at least two servers as masters that are permitted to update a data item from the first subset of data items, and
        a first non-master subset of remaining servers of the server set as non-masters that are not permitted to update the data item, wherein the designation of the first master subset and the first non-master subset of the server set is based on fulfilling the performance criterion of the data set, and wherein at least one server from the first master subset is designated as a non-master with respect to a second data item from a different subset of data items of the data set than the first subset of data items;
    configuring servers of the non-master subset to:
        receive a request to update the data item, and
        forward the request to another server that has been designated as a master of the data item; and
    configuring the at least two masters of the first master subset to:
        receive the request to update the data item;
        update the data item according to the request; and
        propagate the update of the data item to at least one other server of the server set.

2. The method of claim 1, wherein:
    the performance criterion further comprises a consistency level selected from a consistency level set comprising:
        a strong consistency level,
        a bounded staleness consistency level,
        a session consistency level,
        a prefix consistency level, and
        an eventual consistency level; and
    partitioning the server set further comprises: verifying that accesses of the partitioned server set fulfill the consistency level for the data set.

3. The method of claim 1, wherein:
    the performance criterion comprises a latency threshold for propagation of updates to the data set; and
    partitioning the server set further comprises: verifying that updates of the partitioned server set are completed within the latency threshold.

4. The method of claim 1, wherein partitioning the server set based on fulfilling the performance criterion further comprises:
    for a task of the workload, identify a set of paths through the server set by which the task is performed;
    among the set of paths, identify a worst-performing path; and
    verify that the worst-performing path fulfills the performance criterion.

5. The method of claim 4, wherein:
    partitioning the server set further comprises: partitioning the server set into server subsets; and
    configuring the at least two masters of the master subset further comprises:
        for respective server subsets, designating a master of the at least two masters as a local transaction coordinator to update the data set as a local consensus of the server subset; and
        designating the master to coordinate with at least one other master of the at least two masters as a distributed transaction coordinator to propagate the update as a distributed consensus of the server set.

6. The method of claim 1, wherein:
    the server set is distributed over a set of at least two geographic regions; and
    partitioning the server set further comprises: designating at least one server in each region as a master.

7. The method of claim 1, wherein:
    the server set is distributed over a set of at least two geographic regions; and
    partitioning the server set further comprises:
        identifying a geographic location as a source of requests to update the data item from the first subset of data items; and
        designating a server of the server set that is proximate to the geographic location as a master.

8. The method of claim 1, wherein:
    the data items include the first subset of data items and a second subset of data items; and wherein the method further comprises
    for the second subset of data items, partitioning the server set into a second set of masters and non-masters for the second subset of data items, the second set of masters and non-masters being partitioned from the server set.

9. The method of claim 1, further comprising:
    monitoring a performance metric of the server set; and
    responsive to determining that the performance metric of the server set jeopardizes the performance criterion:
        repartitioning the server set based on fulfilling the performance criterion; and
        notifying the servers of the server set about the designations of the repartitioning.

10. The method of claim 1, wherein:
    the partitioning further comprises: identifying, among the at least two masters, a conflict resolution master of data version conflicts involving at least two updates to the first subset of data items; and configuring the at least two masters of the first master subset further comprises:

configuring the conflict resolution master to resolve data version conflicts by:

identifying a data version conflict resolution outcome of the data version conflict, and propagating the data version conflict resolution outcome to other masters of the first subset of data items; and configuring the other masters of the first subset of data items to notify the conflict resolution master of data version conflicts of the first subset of data items.

11. A system for configuring a server set to process a workload of a data set according to performance criterion, the system comprising:

one or more processors;

memory in electronic communication with the one or more processors;

instructions stored in the memory, the instructions being executable by the one or more processors to:

for a first subset of data items of the data set, partition the server set into:

a first master subset of at least two servers as masters that are permitted to update a data item from the first subset of data items, and a first non-master subset of remaining servers of the server set as non-masters that are not permitted to update the data item, wherein the designation of the first master subset and the non-master subset of the server set is based on fulfilling the performance criterion of the data set, and wherein at least one server from the first master subset is designated as a non-master with respect to a second data item from a different subset of data items of the data set than the first subset of data items;

configure servers of the non-master subset to:

receive a request to update the data item, and forward the request to another server that has been designated as a master of the data item; and configure the at least two masters of the first master subset to:

receive the request to update the data item;

update the data item according to the request; and propagate the update of the data item to at least one other server of the server set.

12. The system of claim 11, wherein:

the performance criterion further comprises a consistency level selected from a consistency level set comprising:

a strong consistency level, a bounded staleness consistency level, a session consistency level, a prefix consistency level, and an eventual consistency level; and partitioning the server set further comprises: verifying that accesses of the partitioned server set fulfill the consistency level for the data set.

13. The system of claim 11, wherein:

the performance criterion comprises a latency threshold for propagation of updates to the data set; and partitioning the server set further comprises: verifying that updates of the partitioned server set are completed within the latency threshold.

14. The system of claim 11, wherein partitioning the server set based on fulfilling to fulfill the performance criterion further comprises:

for a task of the workload, identify a set of paths through the server set by which the task is performed;

among the set of paths, identify a worst-performing path; and verify that the worst-performing path fulfills the performance criterion.

15. The system of claim 14, wherein:

partitioning the server set further comprises: partitioning the server set into server subsets; and configuring the at least two masters of the master subset further comprises:

for respective server subsets, designating a master of the at least two masters as a local transaction coordinator to update the data set as a local consensus of the server subset; and designating the master to coordinate with at least one other master of the at least two masters as a distributed transaction coordinator to propagate the update as a distributed consensus of the server set.

16. The system of claim 11, wherein:

the server set is distributed over a set of at least two geographic regions; and partitioning the server set further comprises: designating at least one server in each region as a master.

17. The system of claim 11, wherein:

the server set is distributed over a set of at least two geographic regions; and partitioning the server set further comprises:

identifying a geographic location as a source of requests to update the data item from the first subset of data items; and designating a server of the server set that is proximate to the geographic location as a master.

18. The system of claim 11, wherein:

the data items include the first subset of data items and a second subset of data items; and wherein the method further comprises:

for the second subset of data items, partitioning the server set into a second set of masters and non-masters for the second subset of data items, the second set of masters and non-masters being partitioned from the server set.

19. The system of claim 11, further comprising instructions being executable by the one or more processors to:

monitor a performance metric of the server set; and responsive to determining that the performance metric of the server set jeopardizes the performance criterion:

repartition the server set based on fulfilling the performance criterion; and notify the servers of the server set about the designations of the repartitioning.

20. The system of claim 11, wherein:

the partitioning further comprises: identifying, among the at least two masters, a conflict resolution master of data version conflicts involving at least two updates to the first subset of data items; and configuring the at least two masters of the first master subset further comprises:

configuring the conflict resolution master to resolve data version conflicts by:

identifying a data version conflict resolution outcome of the data version conflict, and propagating the data version conflict resolution outcome to other masters of the first subset of data items; and configuring the other masters of the first subset of data items to notify the conflict resolution master of data version conflicts of the first subset of data items.

\* \* \* \* \*